United States Patent [19]
Katsuma et al.

[11] Patent Number: 5,903,714
[45] Date of Patent: May 11, 1999

[54] THERMAL PRINTING METHOD AND THERMAL PRINTER

[75] Inventors: Nobuo Katsuma; Hiroyuki Matsukawa; Hisashi Enomoto; Yoshiki Kawaoka; Yoshiki Takeoka, all of Saitama, Japan

[73] Assignee: Fuji Photo Film Co., Ltd., Kanagawa, Japan

[21] Appl. No.: 08/644,155

[22] Filed: May 10, 1996

[30] Foreign Application Priority Data

| May 12, 1995 | [JP] | Japan | 7-114627 |
| May 29, 1995 | [JP] | Japan | 7-130264 |
| May 29, 1995 | [JP] | Japan | 7-130265 |
| Jun. 22, 1995 | [JP] | Japan | 7-156345 |
| Jul. 19, 1995 | [JP] | Japan | 7-182761 |
| Jul. 19, 1995 | [JP] | Japan | 7-182762 |

[51] Int. Cl.⁶ .................... G06K 1/00; B41J 2/00
[52] U.S. Cl. .............. 395/109; 395/108; 347/183; 347/186; 347/188
[58] Field of Search ............... 358/298; 395/109, 395/108, 111, 112; 347/183, 186, 188, 175, 191, 194, 211

[56] References Cited

U.S. PATENT DOCUMENTS

| 5,319,391 | 6/1994 | Takahashi et al. | 358/298 |
| 5,661,512 | 8/1997 | Fukuda et al. | 347/175 |

*Primary Examiner*—Edward L. Coles
*Assistant Examiner*—Mark Wallerson

[57] ABSTRACT

A thermal head has a heating element array with a plurality of heating elements disposed in line and a head driver. The head driver drives the heating elements at the same time in accordance with each set of heating data of 8 bits to record dots of one line on a recording sheet. In printing dots by using heating data of 9 bits, a heating data divider circuit divides the 9-bit heating data into two series of 8-bit converted heating data. By using these two series of the 8-bit converted heating data, two heating sequences are continuously executed. Each heating element is heated by the two heating sequences as many times as that corresponding to the heating data.

29 Claims, 28 Drawing Sheets

F I G. 1
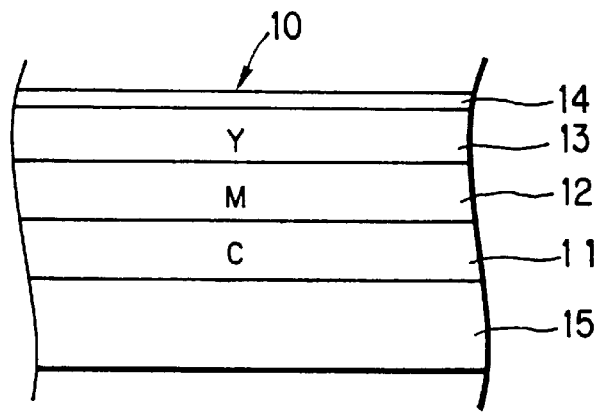
F I G. 2
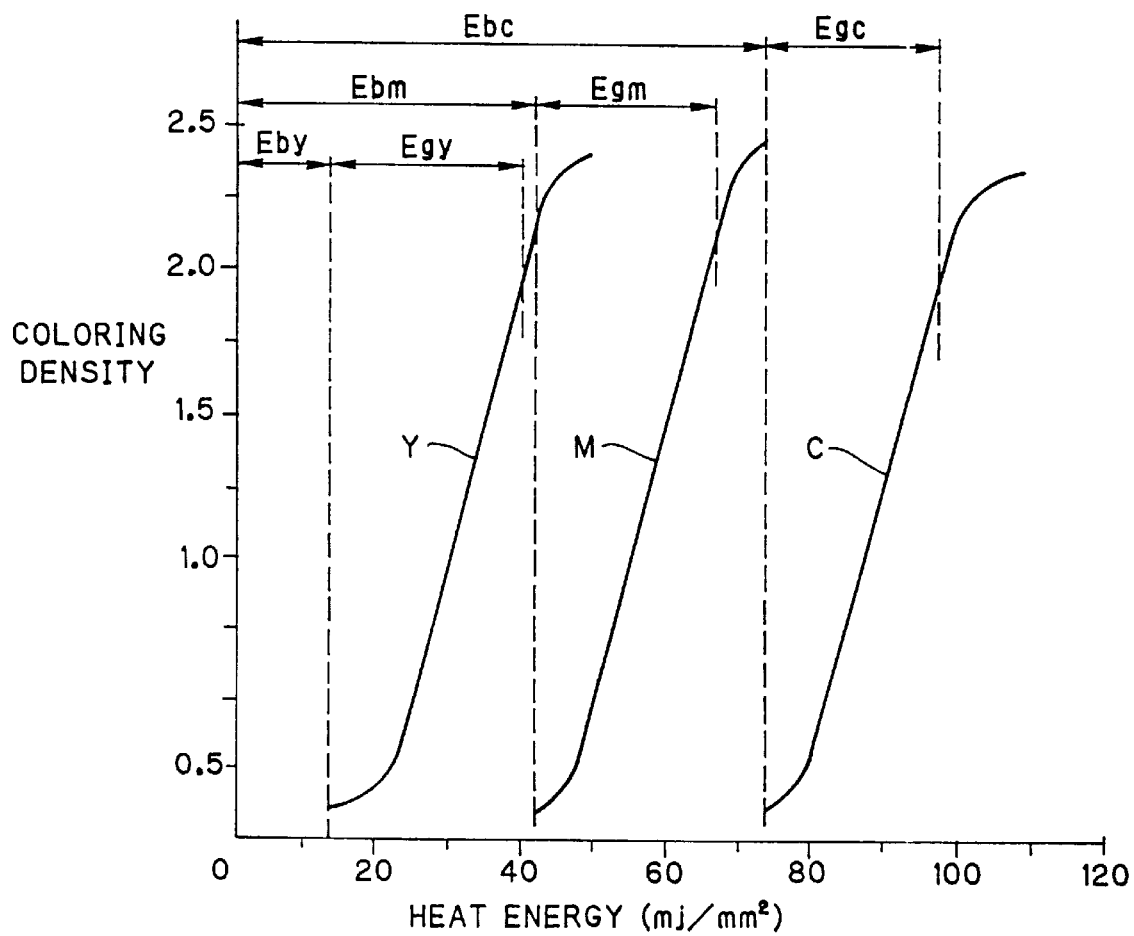

FIG. 6

| IMAGE DATA (9 BITS) | 1ST HEATING SEQUENCE | | 2ND HEATING SEQUENCE | | NUMBER OF DRIVES OF HEATING ELEMENT DURING IMAGE HEATING |
|---|---|---|---|---|---|
| | 1ST CONVERTED IMAGE DATA (8 BITS) | NUMBER OF DRIVES OF HEATING ELEMENT | 2ND CONVERTED IMAGE DATA (8 BITS) | NUMBER OF DRIVES OF HEATING ELEMENT | |
| 0 | 0 | 0 | 0 | 0 | 0 |
| 1 | 1 | 1 | 0 | 0 | 1 |
| 2 | 2 | 2 | 0 | 0 | 2 |
| 3 | 3 | 3 | 0 | 0 | 3 |
| . . . | . . . | . . . | . . . | . . . | . . . |
| 254 | 254 | 254 | 0 | 0 | 254 |
| 255 | 255 | 255 | 0 | 0 | 255 |
| 256 | 255 | 255 | 1 | 1 | 256 |
| 257 | 255 | 255 | 2 | 2 | 257 |
| . . . | . . . | . . . | . . . | . . . | . . . |
| 508 | 255 | 255 | 253 | 253 | 508 |
| 509 | 255 | 255 | 254 | 254 | 509 |
| 510 | 255 | 255 | 255 | 255 | 510 |
| 511 | 255 | 255 | 255 | 255 | 510 |

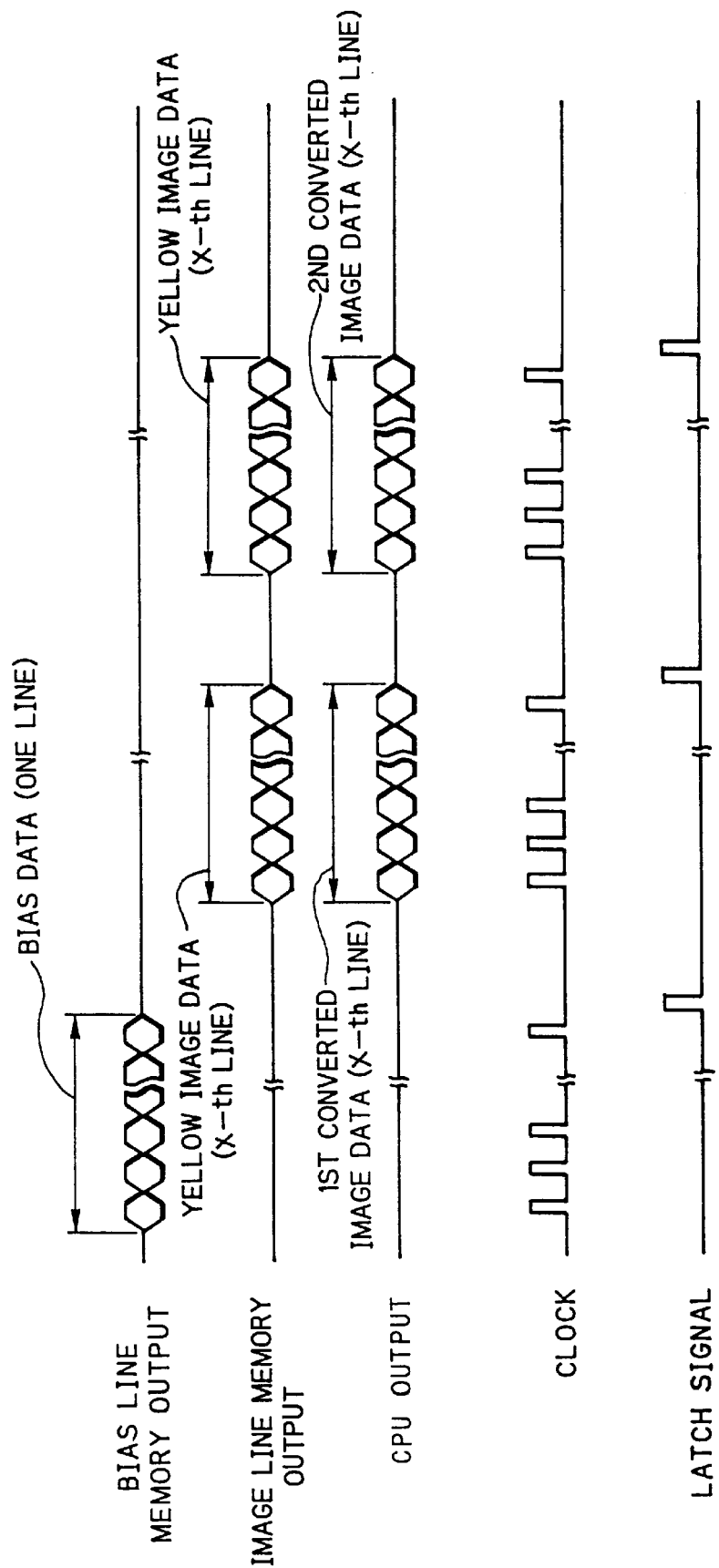

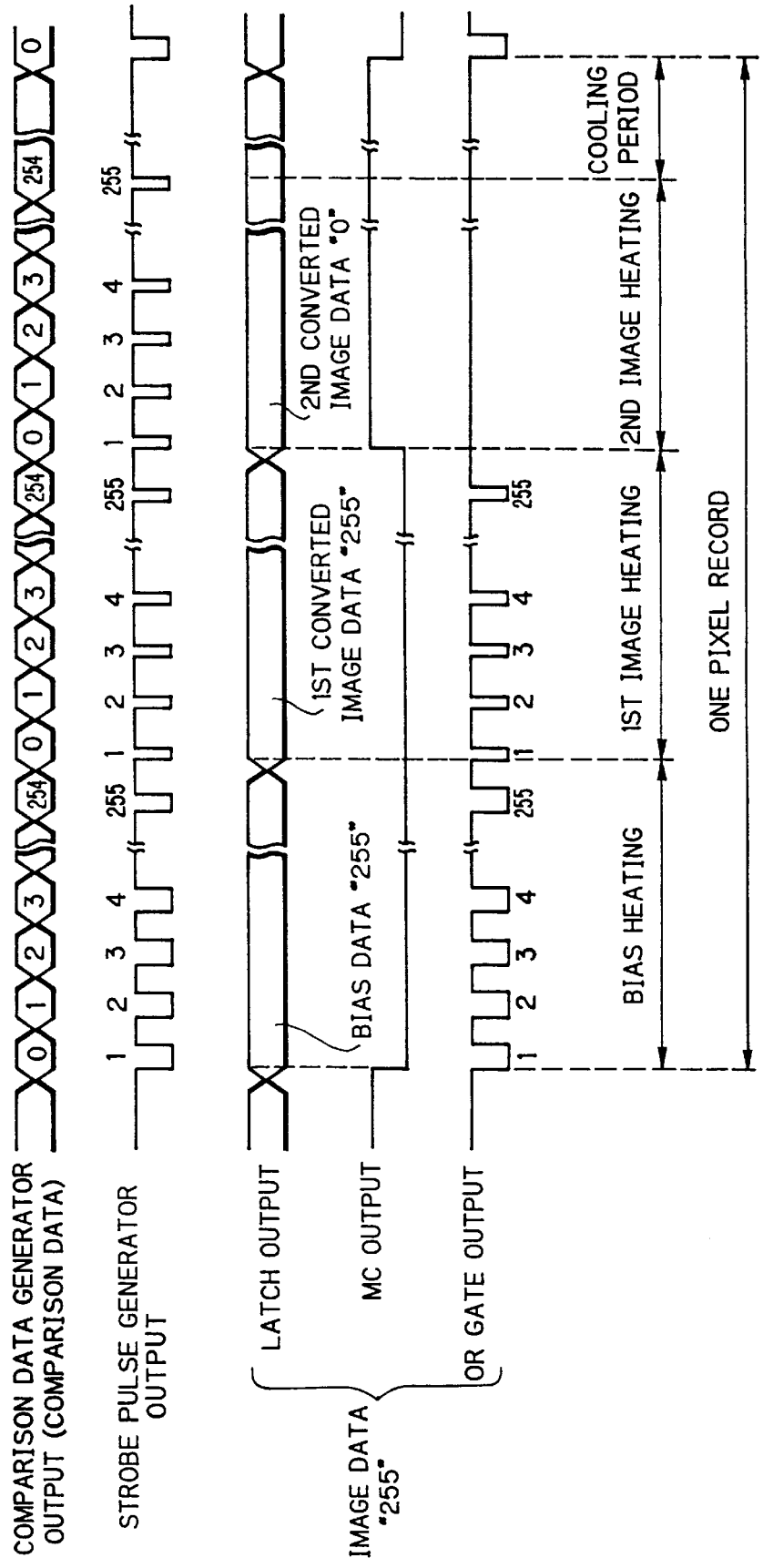

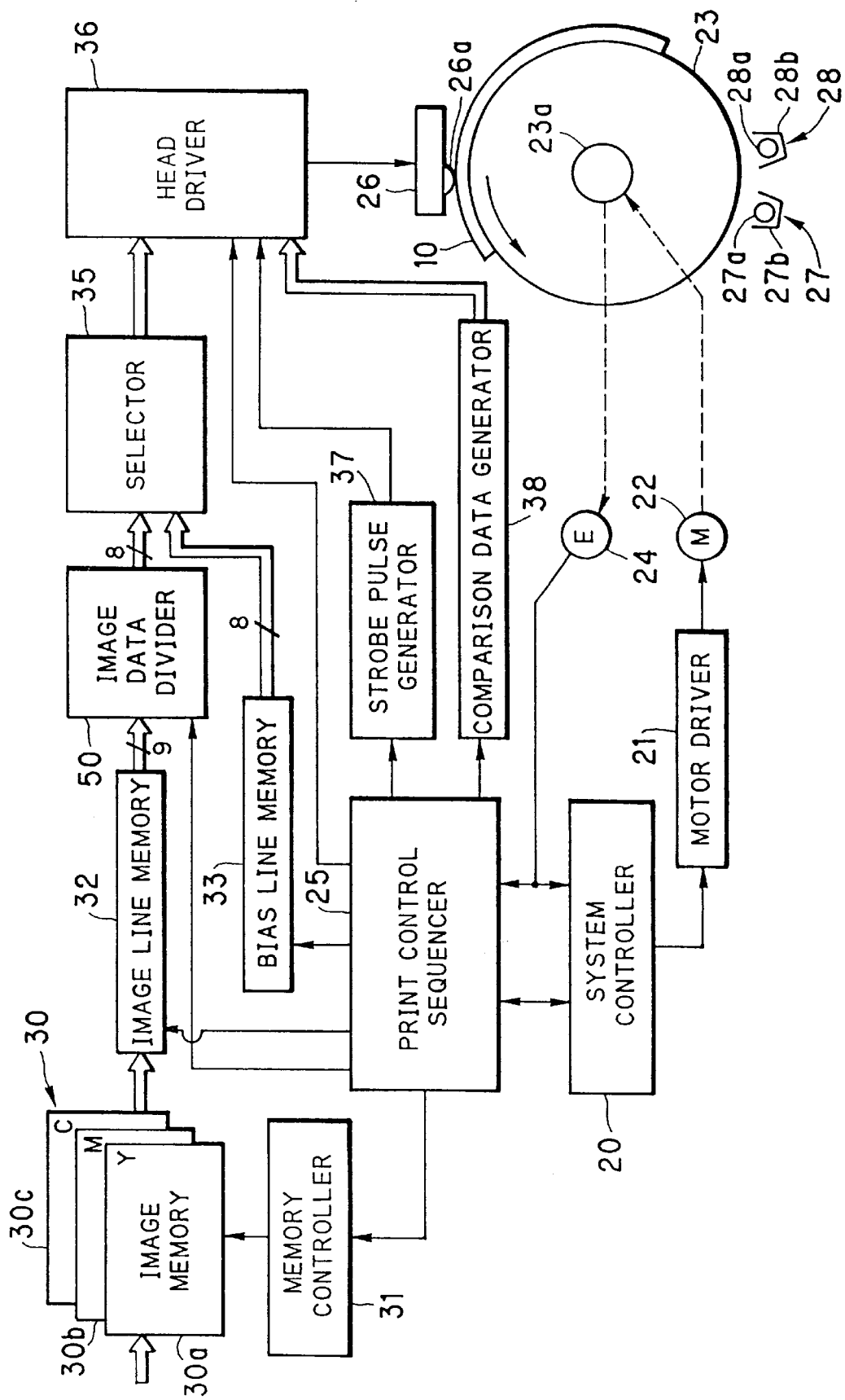

F I G. 1 1
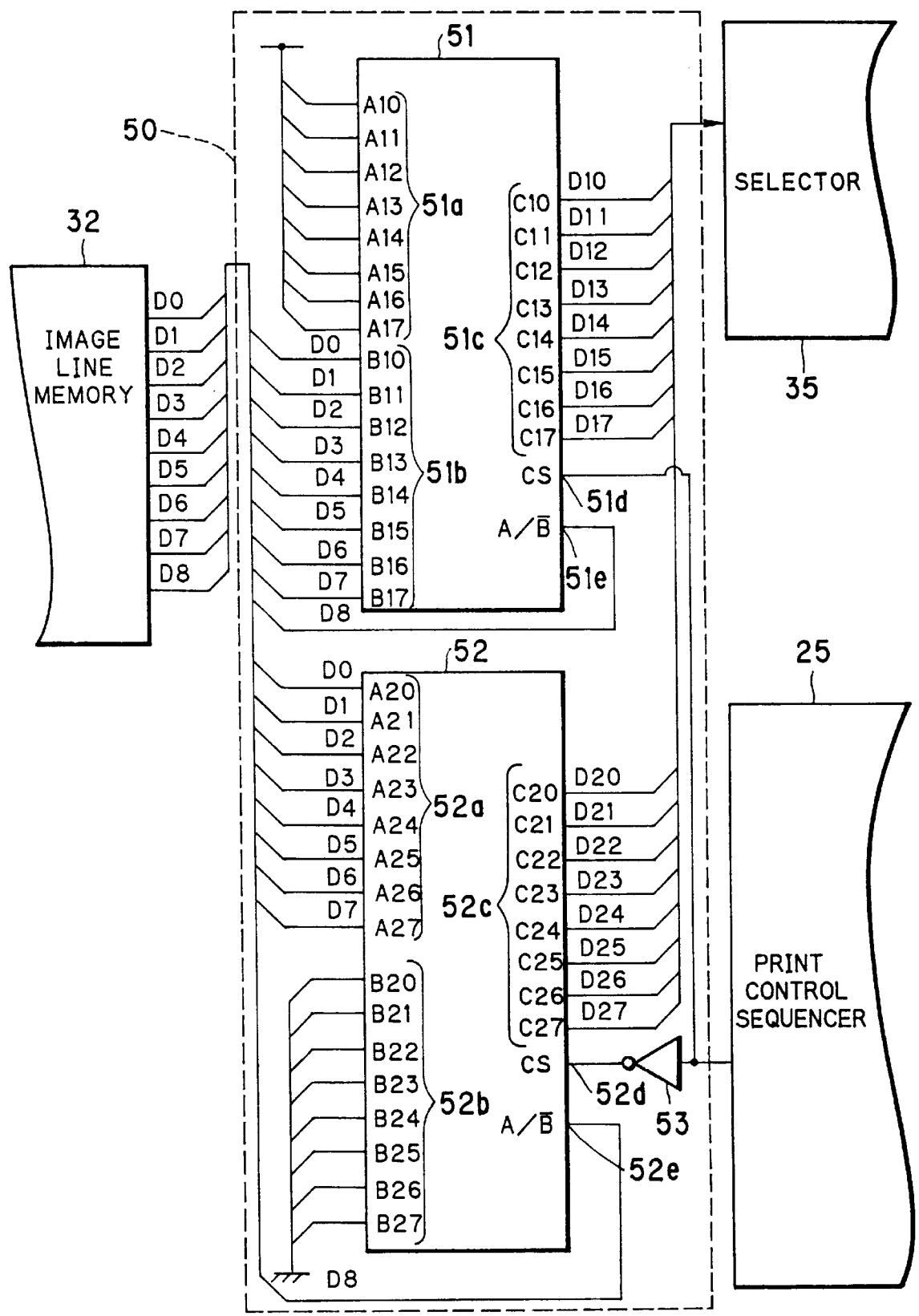

FIG. 12

| IMAGE DATA (9 BITS) | 1ST HEATING SEQUENCE | | 2ND HEATING SEQUENCE | | NUMBER OF DRIVES OF HEATING ELEMENT DURING IMAGE HEATING |
|---|---|---|---|---|---|
| | 1ST CONVERTED IMAGE DATA (8 BITS) | NUMBER OF DRIVES OF HEATING ELEMENT | 2ND CONVERTED IMAGE DATA (8 BITS) | NUMBER OF DRIVES OF HEATING ELEMENT | |
| 0 | 0 | 0 | 0 | 0 | 0 |
| 1 | 1 | 1 | 0 | 0 | 1 |
| 2 | 2 | 2 | 0 | 0 | 2 |
| 3 | 3 | 3 | 0 | 0 | 3 |
| : | : | : | : | : | : |
| 128 | 128 | 128 | 0 | 0 | 128 |
| 129 | 129 | 129 | 0 | 0 | 129 |
| : | : | : | : | : | : |
| 254 | 254 | 254 | 0 | 0 | 254 |
| 255 | 255 | 255 | 0 | 0 | 255 |
| 256 | 255 | 255 | 0 | 0 | 255 |
| 257 | 255 | 255 | 1 | 1 | 256 |
| : | : | : | : | : | : |
| 384 | 255 | 255 | 128 | 128 | 383 |
| 385 | 255 | 255 | 129 | 129 | 384 |
| : | : | : | : | : | : |
| 508 | 255 | 255 | 252 | 252 | 507 |
| 509 | 255 | 255 | 253 | 253 | 508 |
| 510 | 255 | 255 | 254 | 254 | 509 |
| 511 | 255 | 255 | 255 | 255 | 510 |

F I G. 13
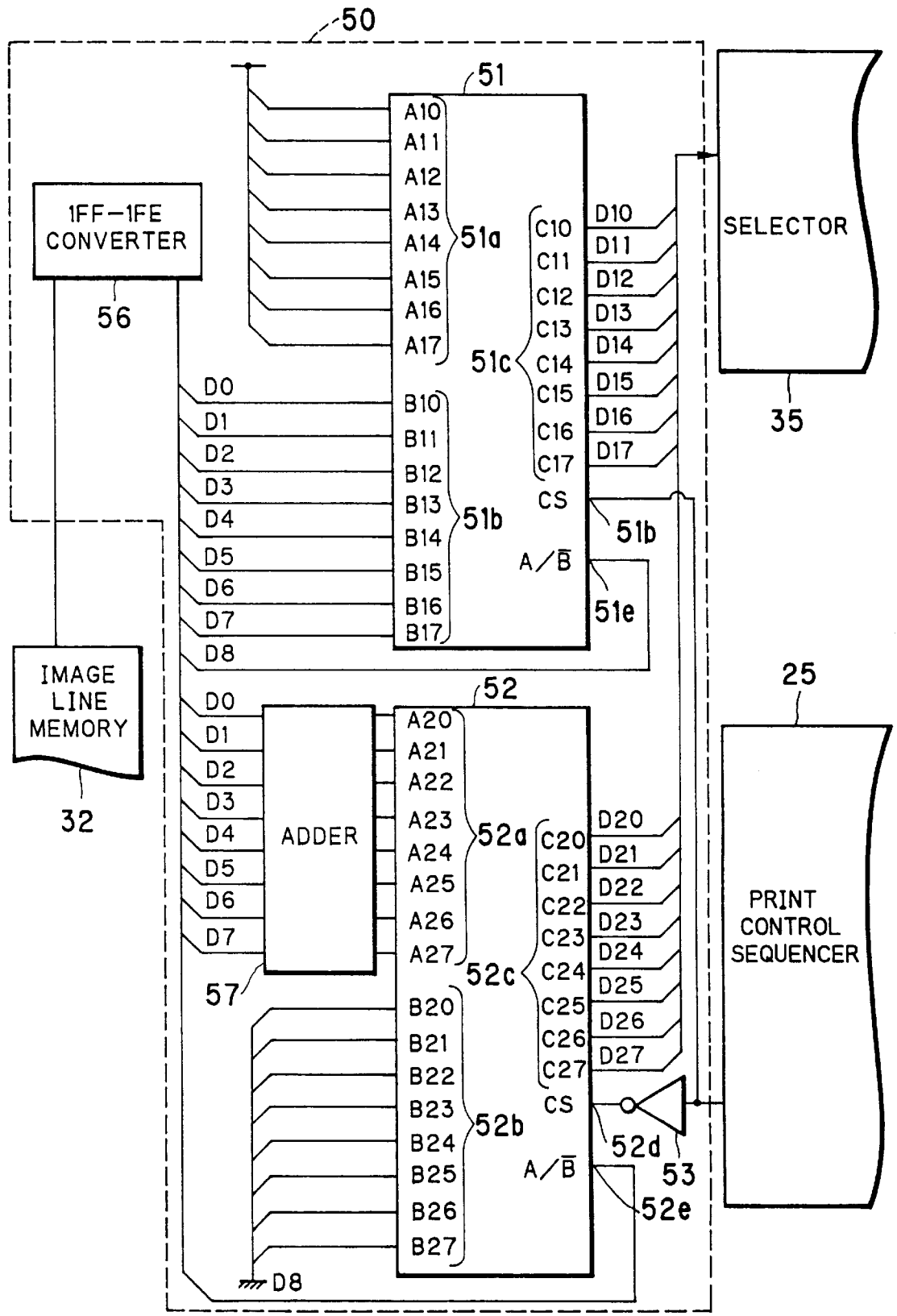

F I G. 2 2

| HEATING DATA (9 BITS) | 1ST CONVERTED HEATING DATA | 2ND CONVERTED HEATING DATA | 3RD CONVERTED HEATING DATA | NUMBER OF DRIVES OF HEATING ELEMENT DURING THREE HEATING SEQUENCE STEPS |
|---|---|---|---|---|
| 0 | 0 | 0 | 0 | 0 |
| 1 | 1 | 0 | 0 | 1 |
| 2 | 2 | 0 | 0 | 2 |
| 3 | 3 | 0 | 0 | 3 |
| . . . | . . . | . . . | . . . | . . . |
| 254 | 254 | 0 | 0 | 254 |
| 255 | 255 | 0 | 0 | 255 |
| 256 | 255 | 1 | 0 | 256 |
| 257 | 255 | 2 | 0 | 257 |
| . . . | . . . | . . . | . . . | . . . |
| 508 | 255 | 253 | 0 | 508 |
| 509 | 255 | 254 | 0 | 509 |
| 510 | 255 | 255 | 0 | 510 |
| 511 | 255 | 255 | 1 | 511 |

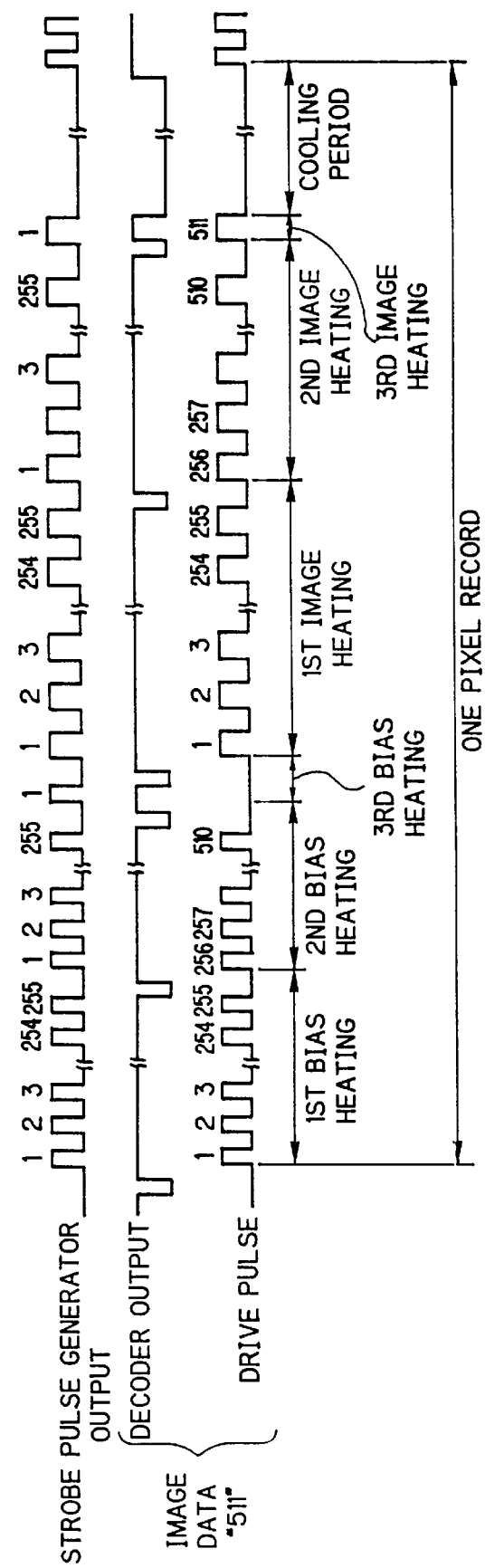

THERMAL PRINTING METHOD AND THERMAL PRINTER

BACKGROUND OF THE INVENTION

1. Field of the Invention

The present invention relates to a thermal printing method and a thermal printer, and more particularly to a thermal printing method and a thermal printer capable of expressing tonal steps larger than that in which a head driver can express inherently.

2. Description of the Background Art

Sublimation transfer type thermal printers and direct imaging type thermal printers have been known, the former heating an ink film with a thermal head and transferring ink to a recording sheet and the latter directly heating a thermosensitive recording sheet with a thermal head to develop color on the sheet. Both types of thermal printers use a thermal head having a plurality of heating elements disposed in a main scan direction, and each heating element is heated to record an image on a recording sheet one line after another, while moving the thermal head or the recording sheet in a sub-scan direction. The heating energy of each heating element is controlled in accordance with heating data of each dot to change the density of the dot to be formed on the recording sheet and express a tonal level of the pixel.

For example, a color thermal printer uses a color thermosensitive recording sheet which has cyan, magenta, and yellow thermosensitive coloring layers, and a protective layer laminated on a supporting layer in this order. Each thermosensitive coloring layer has a different heat energy to develop color, and the deeper layer requires a larger heat energy. Each thermosensitive coloring layer is selectively colored depending upon the different heat energy for coloring from other thermosensitive coloring layers. Prior to recording the next thermosensitive coloring layer, a specific ultraviolet ray is applied to the already recorded thermosensitive coloring layer to fix it so as not to develop color again. In this manner, thermosensitive coloring layers of three colors are sequentially recorded to form a full-color image on a color thermosensitive recording sheet.

In printing one dot on a thermosensitive coloring layer, each heating element supplies the color thermosensitive recording sheet with a heat energy immediately before coloring (hereinafter called a bias heating energy) to perform bias heating. After this bias heating, a heat energy for coloring at a desired density (hereinafter called an image heating energy) is applied to the thermosensitive recording sheet to perform image heating. With these bias heating and image heating, a square pixel area virtually partitioned on the color thermosensitive recording sheet is colored to record one dot.

A thermal head has a heating element array constituted by a number of heating elements disposed in line and a head driver for controlling the heat energy of each heating element in accordance with its heating data. For the bias heating, bias data is used as the heating data, and for the image heating, image data is used as the heating data.

The head driver has a comparator which compares the heating data with sequentially counted-up comparison data to turn the heating element on or off in accordance with the comparison result. The head driver converts the heating data into a train of drive pulses corresponding in number to the value of the heating data. This drive pulse train intermittently drives each heating element of the thermal head. Each heating element may be driven for a time duration corresponding to the heating data.

For example, in recording a half-tone image having "256" tonal levels, an 8-bit thermal head is used to supply the heating data of 8 bits per one pixel to the head driver which converts the 8-bit heating data into a train of serial drive pulses of 0 to 255. This serial drive pulse train drives each heating element 0 to 255 times to change the heat energy 256 steps.

If the number of bits of the heating data is increased to increase the number of tonal levels, a conventionally used thermal head cannot be used. For example, an 8-bit thermal head widely used nowadays cannot record a half-tone image, for example, if using 9-bit heating data to obtain 511 tonal levels.

SUMMARY OF THE INVENTION

It is an object of the present invention to provide a thermal printing method and a thermal printer, capable of recording image data of (K+n) bits by using a K-bit thermal head.

It is another object of the present invention to provide a thermal printing method and a thermal printer, capable of printing an image with high gradation with a low cost thermal head.

In order to achieve the above and other objects, the thermal printing method of this invention uses a heating element array and a head driver, the heating head array having a plurality of heating elements disposed in line and a head driver for driving each heating element at the same time in accordance with each set of heating data of K bits. A heating sequence is started upon inputting of the heating data to the head driver upon a completion of driving each heating element, and dots of one line are recorded by applying a heat energy corresponding to the heating data to a recording sheet. In printing the dots by using heating data of (K+n) bits, the heating data of (K+n) bits is divided into P sets of converted heating data of K bits, and P heating sequences are continuously executed by using each of the P sets of the converted heating data of K bits. The number P of the times of the heating sequence is $2^n$ or $(2^n+1)$.

At each time of the heating sequence, the (K+n)-bit heating data is converted into converted heating data of K bits in accordance with the number J of heating sequences and the value of the (K+n)-bit heating data, and the converted heating data is supplied to the head driver. Bias data and image data are used as the heating data to perform bias heating using the bias data and thereafter image heating using the image data, for the recording of a dot with each heating element.

The thermal printer of this invention has a heating element array, a head driver for driving each heating element at the same time in accordance with each set of heating data of K bits representative of numbers from 0 to N, a print control sequencer, and a heating data divider and one set of heating data is divided into P series of converted heating data to execute P heating sequences. The print control sequencer continuously executes the P heating sequences for a single set of the heating data, where P is an integer equal to or larger than M/N, to print dots having M (M is an integer larger than N) tonal levels by using heating data of (K+n) bits. The heating data divider converts, at a J-th heating sequence where J is an optional number from 1 to P, the (K+n)-bit heating data into K-bit converted heating data in accordance with the number J and the value represented by the (K+n)-bit heating data, and supplies the converted heating data to the head driver.

In a preferred embodiment of the thermal printer, a data converter is provided for converting the heating data having a value 0 into the heating data having a value 1 and supplies the latter to the head driver.

According to this invention, in recording dots with a K-bit thermal printer by using the heating data of (K+n) dots, the (K+n)-bit heating data is divided into P series of K-bit converted heating data to continuously execute P heating sequences. Accordingly, the number of tonal levels obtainable by the thermal head can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects and advantages of the invention will become apparent from the following detailed description of the preferred embodiments when read in conjunction with the accompanying drawings which are given by way of illustration only, and thus, are not limitative of the present invention, and wherein:

FIG. 1 is an explanatory view of the layer structure of a color thermosensitive recording sheet;

FIG. 2 is a graph showing coloring characteristics of a color thermosensitive recording sheet;

FIG. 6 is a table showing the relationship among image data, converted image data, and the number of heating times;

FIG. 8 is a timing chart illustrating the data conversion for one line print;

FIGS. 9A–9C are timing charts illustrating the operation of the head driver printing one line;

FIG. 10 is a schematic diagram showing the outline of a thermal printer using an image data divider according to the invention;

FIG. 11 is a circuit diagram of the image data divider;

FIG. 12 is a table illustrating the relationship among image data, converted image data, and the number of heating times, when using the image data divider shown in FIG. 11;

FIG. 13 is a circuit diagram of another example of the image data divider;

FIG. 22 is a table showing the relationship among heating data, converted heating data, and the number of heating times;

FIG. 23 is a timing chart illustrating the print state;

DETAILED DESCRIPTION OF THE PREFERRED EMBODIMENTS

Figure 3:
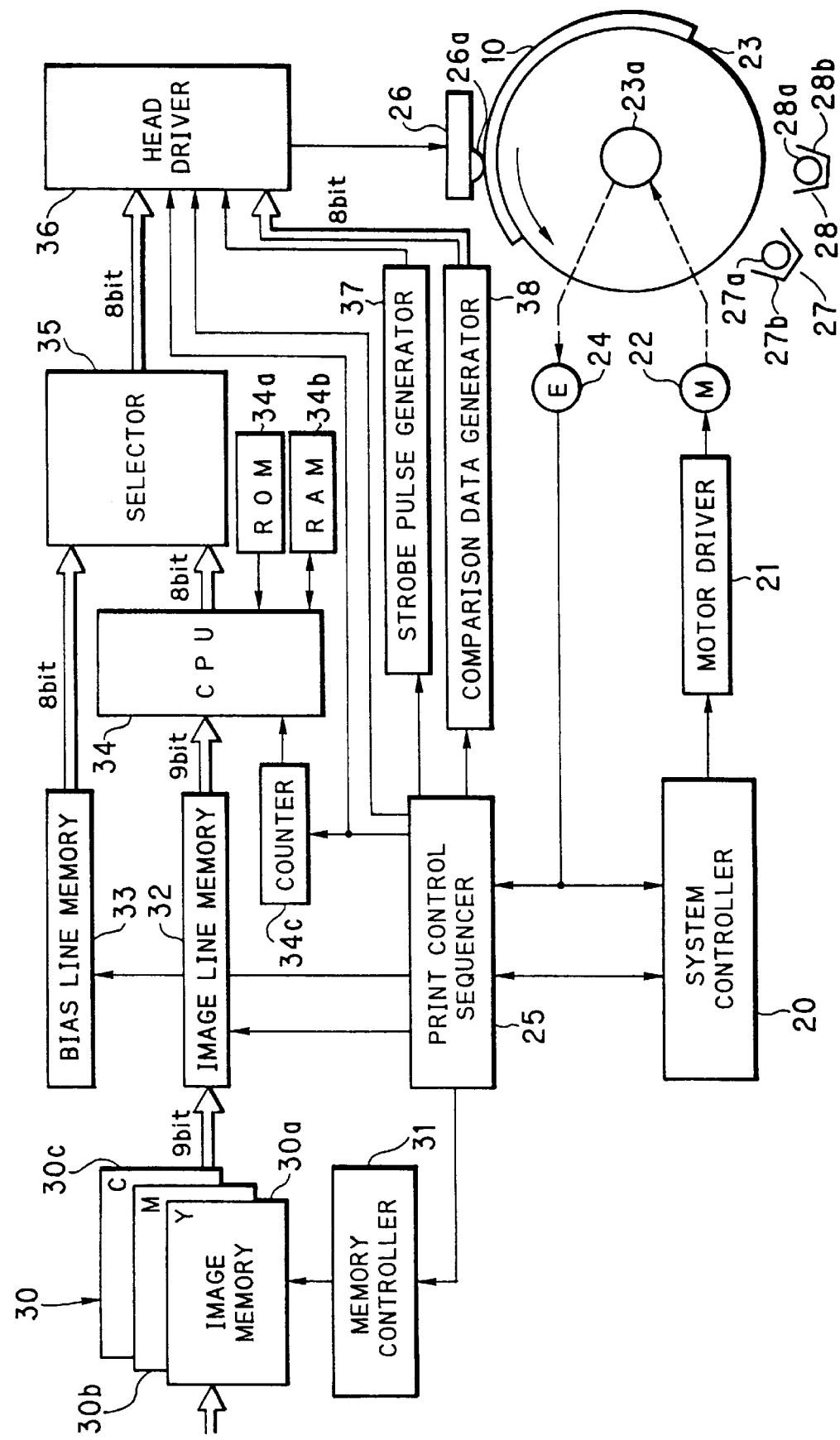
FIG. 3 is a schematic diagram of a color thermal printer according to an embodiment of the invention.

Referring to FIG. 1 showing an example of the layer structure of a color thermosensitive recording sheet, the sheet 10 has a cyan thermosensitive coloring layer 11, a magenta thermosensitive coloring layer 12 having an optical property of being fixed by ultraviolet rays of 365 nm, a yellow thermosensitive coloring layer 13 having an optical property of being fixed by ultraviolet rays of 420 nm, and a transparent protective layer 14 laminated on a supporting layer 15 in this order. Each thermosensitive coloring layer 11 to 13 is laminated in the order of coloring the layers. If the thermal recording order is magenta, yellow, and cyan, then the yellow thermosensitive coloring layer 13 and magenta thermosensitive coloring layer 12 are interchanged.

Between the thermosensitive coloring layers 11 to 13, intermediate layers for adjusting the heat sensitivity of each thermosensitive coloring layer are inserted in actual, but they are not shown in FIG. 1. The supporting layer 15 is made of an opaque coat sheet or plastic film. If an OHP sheet is to be formed, a transparent plastic film is used.

FIG. 2 is a graph showing coloring characteristics of each thermosensitive coloring layer 11 to 13. Each thermosensitive coloring layer 11 to 13 at a deeper position requires a larger coloring heat energy. Of the color thermosensitive recording sheet 10, the yellow thermosensitive coloring layer 13 has a lowest coloring heat energy, and the cyan thermosensitive coloring layer 11 has a highest coloring heat energy.

In recording a yellow pixel, a heat energy of a yellow bias heating energy Eby and image heating energy Egy is supplied to the color thermosensitive recording sheet. The bias heating energy Eby is a heat energy immediately before the yellow thermosensitive coloring layer 13 develops color, and is applied to the color thermosensitive recording sheet 10 during a bias heating period at the initial stage of recording one pixel. The image heating energy Egy is determined from a coloring density of a pixel to be printed, and is applied to the color thermosensitive recording sheet 10 during an image heating period after the bias heating period. The above description is also applicable to magenta and cyan, with symbols Ebm, Egm, Ebc, and Egc being given in FIG. 2.

Referring to FIG. 3 showing the outline of a color thermal printer, a system controller 20 controls a transport system and a record system in accordance with predetermined sequences. The transport system is constituted by a motor driver 21, a pulse motor 22, a platen drum 23, and a rotary encoder 24. The motor driver 21 generates a motor drive pulse to drive the pulse motor 22. Rotation force of the pulse motor 22 is transmitted to a platen shaft 23a of the platen drum 23 to continuously rotate it. A color thermosensitive recording sheet 10 fed to the platen drum 23 is wound about the outer periphery of the platen drum 23 and transported in a sub-scan direction indicated by an arrow, as the platen drum 23 rotates.

A rotary encoder 24 is coupled to the platen shaft 23a of the platen drum 23. The rotary encoder 24 generates an encode pulse each time the platen drum 23 rotates by a predetermined pitch. This encode pulse is supplied to the system controller 20 and to the print control sequencer 25 of the record system. In response to encode pulses, the system controller 20 and print control sequencer 25 perform a sequence control of each circuit element of the systems. Instead of performing a sequence control of each circuit element by using encode pulses, this sequence control may be performed by using motor drive pulses.

Near the outer periphery of the platen drum 23, a thermal head 26, a yellow optical fixer 27, and a magenta optical fixer 28 are disposed. The thermal head 26 has a heating element array 26a constituted by a number of heating elements disposed in line in the main scan direction (axial direction of the platen drum). The heating element array 26a of the thermal head 26 is made in tight contact with the color thermosensitive recording sheet 10 when an image is recorded on the color thermosensitive recording sheet 10.

The yellow optical fixer 27 is constituted by an ultraviolet lamp 27a for radiating ultraviolet rays having an emission peak of 420 nm, and a lamp house 27b. The yellow optical fixer 27 applies ultraviolet rays of 420 nm to the color thermosensitive recording sheet 10 after a yellow image is recorded, so that a coloring ability of the yellow thermosensitive coloring layer 13 is lost.

The magenta optical fixer 28 is constituted by an ultraviolet lamp 28a for radiating ultraviolet rays having an emission peak of 365 nm, and a lamp house 28b. The magenta optical fixer 28 applies ultraviolet rays of 365 nm to the color thermosensitive recording sheet 10 after a magenta image is recorded, so that a coloring ability of the magenta thermosensitive coloring layer 12 is lost.

The record system includes the heating element array 26a, an image memory unit 30, a memory controller 31, an image line memory 32, a bias line memory 33, a CPU 34, a selector 35, a head driver 36, a strobe pulse generator 37, a comparison data generator 38, a print control sequencer 25 for controlling these circuit elements, and other necessary circuit elements.

As stated earlier, each heating element is sequentially subjected to the bias heating and image heating for recording one dot on each thermosensitive coloring layer. For the bias heating, 8-bit bias data is used to generate a predetermined bias heating energy shown in FIG. 2. This bias data is applied to all heating elements irrespective of a presence/absence of a dot to be recorded. For the image heating, 9-bit image data is used to generate an image heating energy corresponding to the coloring density as shown in FIG. 2. If the bias data and image data are not required to be discriminated therebetween, these data are collectively called heating data hereinafter where applicable.

The process starting from supplying heating data to the head driver 36 to completing heating of each heating element, is called a heating sequence. Strictly speaking, the heating sequence is the process starting from reading heating data from the memory to completing heating of each heating element. In this embodiment, the head driver 36 is supplied with 8-bit heating data representative of numbers of 0 to 255 to record a half-tone image of 256 tonal levels. 8-bit bias data is used for the bias heating so that one heating sequence is executed for the bias heating. For the image heating, 9-bit image data representative of numbers of 0 to 511 (=N) is used. However, the number (=M) of tonal levels obtainable by two heating sequences is 510, and M/N=510/255. The total number P of heating sequences is therefore set to 2 because the maximum value of an integer of the quotient is 2. In this example, n=1 when representing $P=2^n$.

In addition to the heating element array 26a, the thermal head 26 has the head driver 36, strobe pulse generator 37, and comparison data generator 38 which are in FIG. 3 shown separated from the thermal head 26. Obviously, the head driver 36 and other circuit elements may be provided separately from the thermal head 26.

The image memory unit 30 is constituted by an yellow (Y) image memory 30a, a magenta (M) image memory 30b, and a cyan (C) image memory 30c. These image memories 30a to 30c are controlled by the memory controller 31 for the read/write of 9-bit image data.

An image to be printed is subjected to three color separation and photometry with a scanner or the like, and converted into image data representative of a color density of a dot to be printed by 9 bits. Therefore, the pixel density is quantized 512 levels from a lowest density of 0 tonal level to a highest density of 511-th tonal level. For example, image data of 0 tonal level has its value "0" in decimal notation, and image data of 511-th tonal level has its value "511" in decimal notation. Yellow image data is written in the yellow image memory 30a, magenta image data is written in the magenta image memory 30b, and cyan image data is written in the cyan image memory 30c. CPU 34 divides or converts the 9-bit image data into two 8-bit converted image data. Numerical values of addition of two converted image data indicate the value of 9-bit image data. CPU 34 is connected to a ROM 34a, a RAM 34b, and a counter 34c. Programs and the like used for the conversion of image data are previously written in ROM 34a, and CPU 34 performs a conversion operation in accordance with the programs. RAM 34b is used as the working memory for storing data necessary for the conversion process.

The counter 34c operates only for the image heating. A latch signal is input to this counter 34c from the print control sequencer 25. Each time a latch signal is input, the count value J is incremented by one. This counter is a cyclic type counter, and takes a value "0" at the initial state. When the count value J is "2" and the next latch signal is input, the count value J takes "0" again. This count value J is sent to CPU 34 as the number of heating sequences during the image heating.

In printing an image, color image data of one line to be printed is read from the image memory unit 30, and written in the image line memory 32. Red, green, and blue image data may be used. In this case, these image data read from an image memory is converted into yellow, magenta, and cyan image data by using a color conversion circuit. One line image data written in the image line memory 32 is sequentially read and supplied to CPU 34. Reading image data is performed twice for each line.

As described previously, CPU 34 converts the 9-bit image data into 8-bit converted image data, in accordance with the number (J) of heating sequences and the value of the image data. Namely, at the first heating sequence, one line image data is converted into 8-bit first converted image data. At the second heating sequence, the image data is converted into second converted image data. In the following description, if the first and second converted image data are not required to be discriminated therebetween, they are simply called converted image data.

8-bit bias data is being stored in the bias line memory 33. The bias data has a value of, for example, "255". Heating elements have a variation in their resistance value so that even if the same bias data is used, the heat energy generated becomes different. In order to correct an error of the heat energy, it is preferable to set bias data reflected upon the resistance error, to each heating element.

In recording one line of each color, the selector 35 first connects the bias line memory 33 to the head driver 36. In this case, each pixel data of one line bias data is sequentially read from the bias memory 33, and supplied to the head driver 36 via the selector 35. Thereafter, the selector 35 connects CPU 34 to the head driver 36 to supply the converted image data from CPU 34 to the head driver 36.

The strobe pulse generator 37 generates a strobe pulse of "L level" and supplies it to the head driver 36 so as to control the power conduction time of each heating element. During the generation of this strobe pulse, the heating element is powered and heated.

Strobe pulses include a bias heating strobe pulse and an image heating strobe pulse. Each of these pulses has a different pulse width depending on color. The pulse widths of the color bias heating strobe pulse and image heating strobe pulse are determined from the characteristic curves of the color thermosensitive recording sheet 10.

The comparison data generator 38 sequentially generates 8-bit comparison data from "0" to "254" both during the bias heating and image heating. The comparison data of "0" to "254" is generated once for the bias heating and twice for the image heating, and supplied to the head driver 36.

Figure 4:
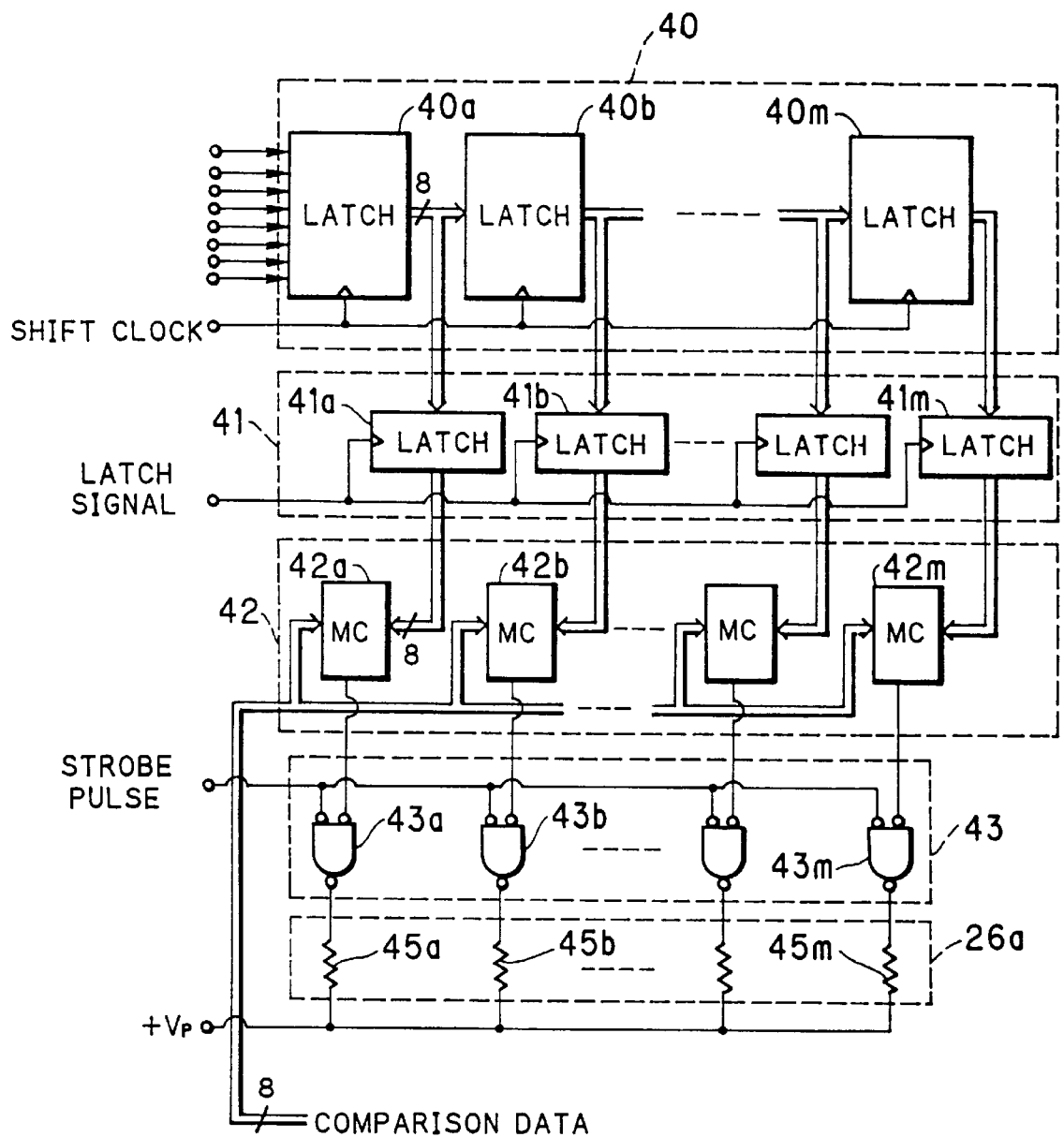
FIG. 4 is a circuit diagram of a head driver using a comparator.

As shown in FIG. 4, the head driver 36 is constituted by a shift register 40, a latch array 41, a comparator array 42, and a gate array 43, respectively of 8 bits. The shift register 40 is constituted by serially connected m 8-bit latch circuits 40a to 40m. These 8-bit latch circuits 40a and 40b each have eight input terminals and eight output terminals to input and output 8-bit heating data. The shift register 40 receives each pixel data set of 8-bit parallel heating data from the selector 35, sequentially latches it in response to the clock of the print control sequencer 25, and outputs one line heating data in parallel to the latch array 41.

The latch array 41 is constituted by m 8-bit latch circuits 41a to 41m, and latches pixel data sets of one line heating data, in response to the latch signal from the print control sequencer 25, and outputs the one line heating data to the comparator array 42. The comparator array 42 is constituted by m 8-bit magnitude comparators (MC) 42a to 42m which sequentially compare the heating data with the comparison data of "0" to "254" from the comparison data generator 38, and outputs drive data. In this comparison, if the heating data is larger than the comparison data, the drive data is of "L level", and if smaller or equal, the drive data is of "H level".

For the bias heating, the bias data is "255" and so it is converted into 255 drive data of "L level". For the image heating, the first converted image data is compared 255 times, and then the second converted image data is compared 255 times, totaling 510 comparisons, to generate drive data of "L level" corresponding in number to the value of 9-bit image data. The drive data from the comparator array 42 is supplied to the gate array 43.

The gate array 43 is constituted by m OR gate circuits 43a to 43m. Each OR gate circuit 43a to 43m is supplied with the drive data and the strobe pulse from the strobe pulse generator 37. If the strobe pulse is input while the drive data takes the "L level", the "L level" drive pulse is output while the input strobe pulse continues.

The gate array 43 is connected to heating elements 45a to 45m of the heating element array 26a. Each heating element 45a to 45m is powered and heated while a corresponding one of the OR gate circuits 43a to 43m outputs the drive pulse.

Figure 5:
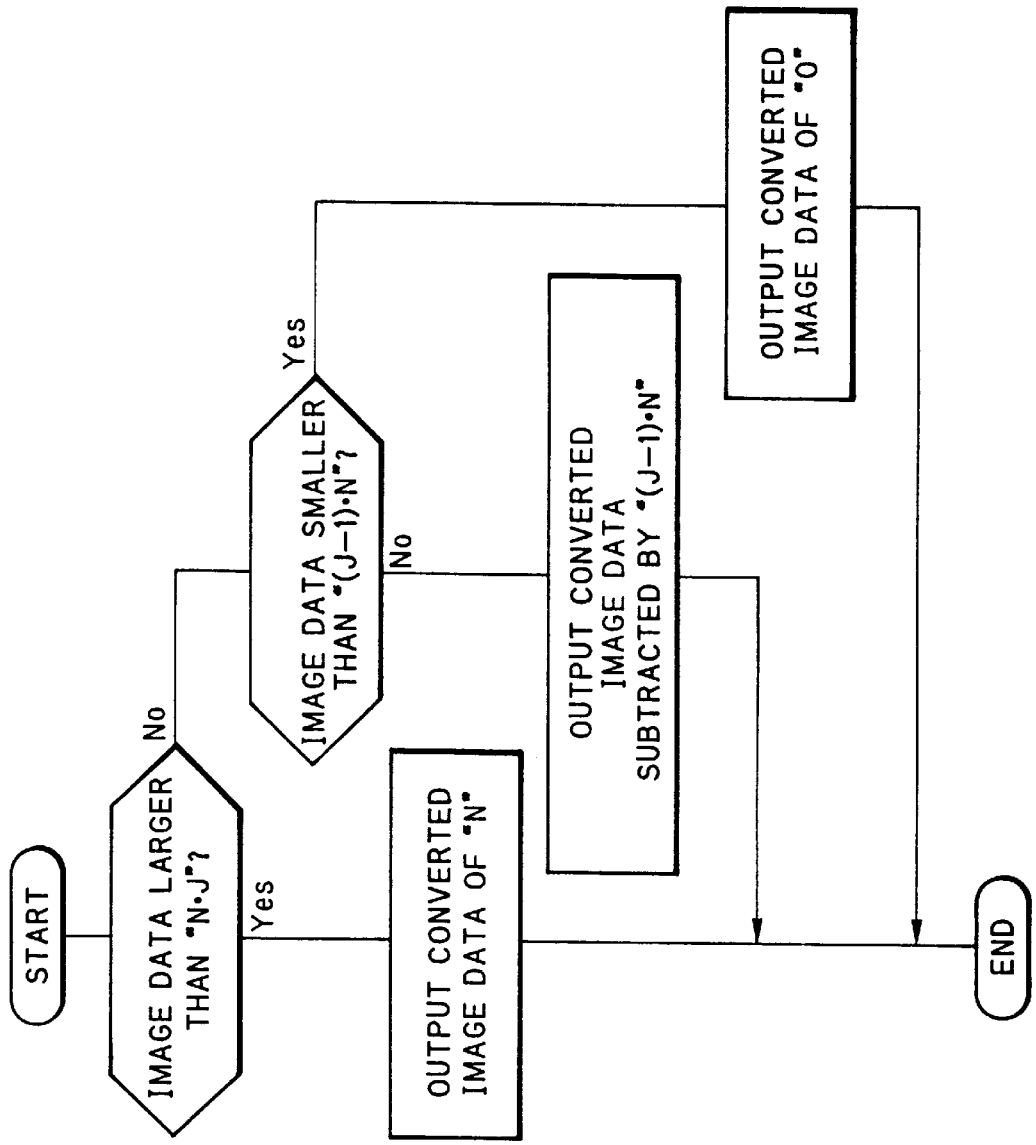
FIG. 5 is a flow chart illustrating a process of converting image data into converted image data.

FIG. 5 is a flow chart illustrating the process of converting the image data by CPU 34. CPU 34 compares the 9-bit image data with a number "N×J". The number N takes the same value as the highest tonal level obtainable by the head driver 36, and is "255" in this embodiment. The number J is the count value of the counter 34c, and indicates the J-th heating sequence during the image heating.

CPU 34 outputs 8-bit converted image data representative the number "255" if the image data is larger than the number "N×J". In this embodiment, this conversion is effected if the image data having a tonal level "256" or higher is input during the first heating sequence (J=1).

If the image data is equal to or less than the number "N×J", the image data is compared with a number "(J−1)× N". If the image data is equal to or larger than the number "(J−1)×N", CPU 34 outputs 8-bit converted image data representative of a number equal to the image data having the number "(J−1)×N". If the image data is smaller than the number "(J−1)×N", CPU 34 outputs 8-bit converted image data representative of the number "0" or 0 tonal level.

In the above manner, CPU 34 generates 8-bit first and second converted image data from the 9-bit image data. The relationship among the image data, converted image data, and the number of drive times of each heating element is shown in FIG. 6. Instead of performing the conversion process of image data by using a calculation process, a table may be used for the conversion process in which table the number representative of image data and converted image data for each print sequence number J of the image heating are stored.

Figure 7:
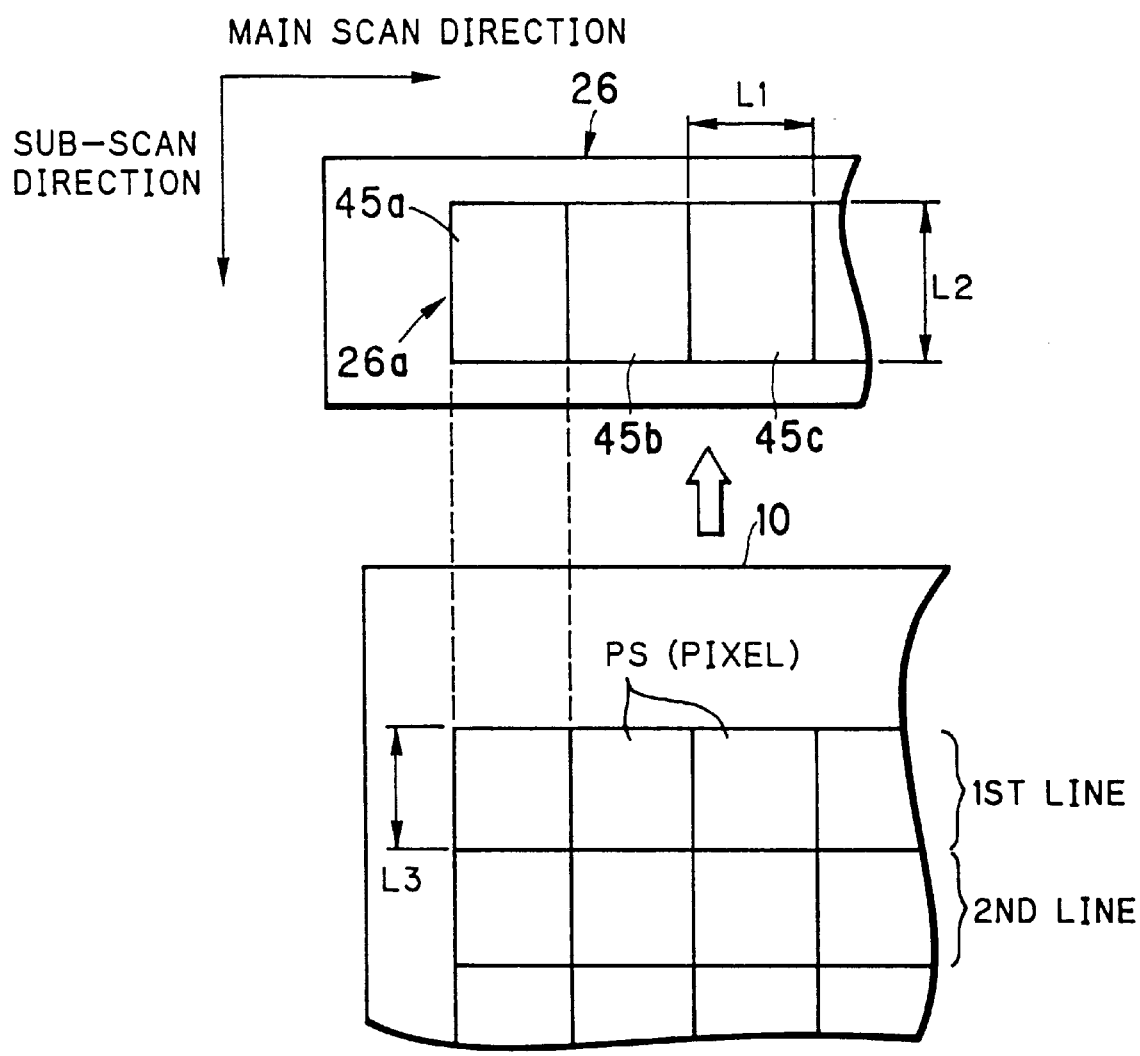
FIG. 7 is an explanatory view of a print state of a color thermosensitive recording sheet.

Referring to FIG. 7 showing a record state of a color thermosensitive recording sheet 10, the heating element array 26a has a number of heating elements 45a to 45m disposed in the main scan direction. Each heating element 45a to 45m has, for example, a length L1 of 140 μm in the main scan direction and a length L2 of 210 μm in the sub-scan direction (moving direction of the color thermosensitive recording sheet 10). Each heating element 45a to 45m is powered and heated with the head driver 36 and heats the color thermosensitive recording sheet 10.

Each heating element 45a to 45m has a smaller heat dissipation in the main scan direction than in the sub-scan direction so that the temperature at both ends of each heating element does not rise more than the central area. As a result, the length L3 of the recorded one pixel in the sub scan becomes, for example, 156 μm. This one line is formed by a plurality of pixels PS each being recorded by a corresponding heating element.

Next, the operation of this thermal printer will be described with reference to FIGS. 8 and 9. Yellow image data (9 bits) of an image to be printed is written in the yellow image memory 30a, magenta image data is written in the magenta image memory 30b, and cyan image data is written in the cyan image memory 30c. After the image data of three colors is written, a print start switch (not shown) is manipulated. Upon manipulation of this print start switch, the system controller 20 initializes each circuit, and a color thermosensitive recording sheet 10 is fed from the paper feeder cassette.

When the color thermosensitive recording sheet 10 reaches the platen drum 23, a clamp (not shown) on the platen drum 23 side fixes the front end of the color thermosensitive recording sheet 10 to the platen drum 23. Next, the system controller 20 instructs the motor driver 21 to rotate the pulse motor 22. As the pulse motor 22 rotates, the platen drum 23 is rotated continuously at a constant speed so that the color thermosensitive recording sheet 10 is wound about the platen drum 23 and transported in the sub-scan direction.

As the color thermosensitive recording sheet 10 is transported and its front end reaches the position of the thermal head 26, the system controller 20 instructs the print control sequencer 25 to move the thermal head 26 down. The thermal head 26 is then swung down and becomes in tight contact with the color thermosensitive recording sheet 10. At the same time, the print control sequencer 25 instructs the memory controller 31 to read the first line of the yellow image from the yellow image memory 30a of the image memory unit 30. Each pixel data set of the yellow image data of the first line is sequentially read from the yellow image memory 30a and written in the image line memory 32.

When the front end of the recording area of the color thermosensitive recording sheet 10 reaches the position of the thermal head 26, the system controller 20 instructs to print the first line. In order to detect the transport position of the color thermosensitive recording sheet 10, the following operation is carried out. After the front end of the color thermosensitive recording sheet 10 is detected with a photosensor or the like, the number of encode pulses from the rotary encoder 24 is counted. When the count value reaches a predetermined value, it is judged that the recording area has reached the position of the thermal head 26. This predetermined value is the number of encode pulses corresponding to the length from the front end of the color thermosensitive recording sheet 10 to the record start position thereof.

The print control sequencer 25 connects the selector 35 to the bias line memory 33 to start reading the bias data therefrom and start executing a heating sequence of the bias heating. A bias data set of one line bias data of "255" is sequentially read from the bias line memory 33 and supplied to the shift register 40 of the head driver 36. Each time one bias data set is supplied, a shift clock is supplied from the print control sequencer 25 to the shift register 40. In response to this shift clock, each bias data set is shifted in the shift register 40 to eventually latch one line bias data.

When the one line bias data is latched in the shift register 40, it is then latched in the latch array 41 in response to the latch signal from the print control sequencer 25. In response to this latch signal, the count J of the counter 34c is incremented to take a value "1". The latched one line bias data is then supplied to the comparator array 42. On the other hand, the print control sequencer 25 resets a counter of the comparison data generator 38 to "0". The comparison data generator 38 supplies the comparison data "0" to each 8-bit magnitude comparator 42a to 42m of the comparator array 42.

Each 8-bit magnitude comparator 42a to 42m compares the input bias data and the comparison data "0", and if the former is larger than the latter, outputs drive data of "L level". Since each 8-bit magnitude comparator 42a to 42m compares the comparison data "0" with all data sets of one line bias data of "255", the drive data of "L level" is output in parallel from all the 8-bit magnitude comparators 42a to 42m.

This one line drive data is supplied to the gate array 43 which takes a logical sum of each pixel data set of the one line drive data and the yellow bias heating strobe pulse supplied from the strobe pulse generator 37. Since all sets of the drive data is of "L level", each OR gate circuit 43a to 43m outputs each pixel data of one line bias drive data of "L level" having the same pulse width as the bias heating strobe pulse. This first bias drive pulse is indicated by a numeral "1" in FIGS. 9A–9C. Each bias drive pulse drives and heats a corresponding one of the heating elements 45a to 45m. Each bias drive pulse has a voltage Vp and a pulse width same as that of the bias heating strobe pulse.

Figure 9A:
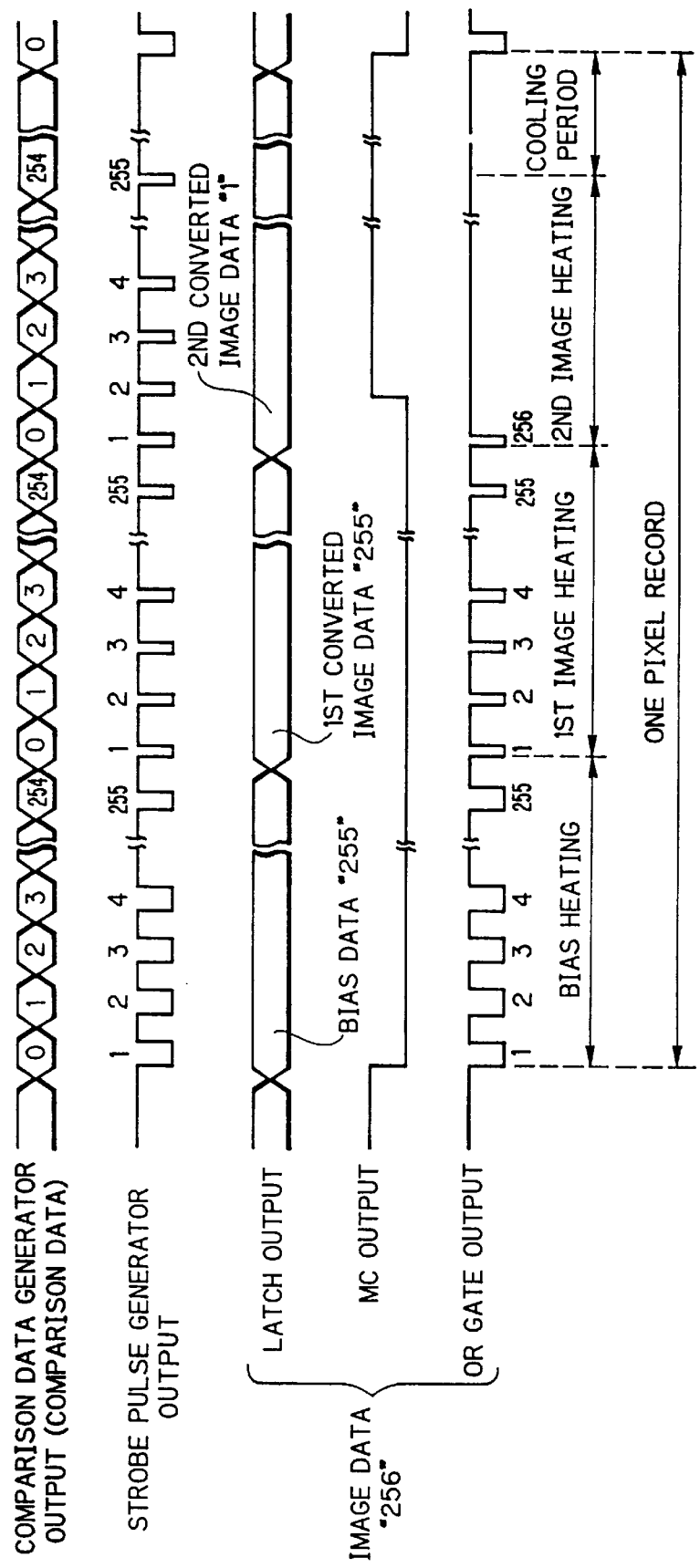
Figure 9B:
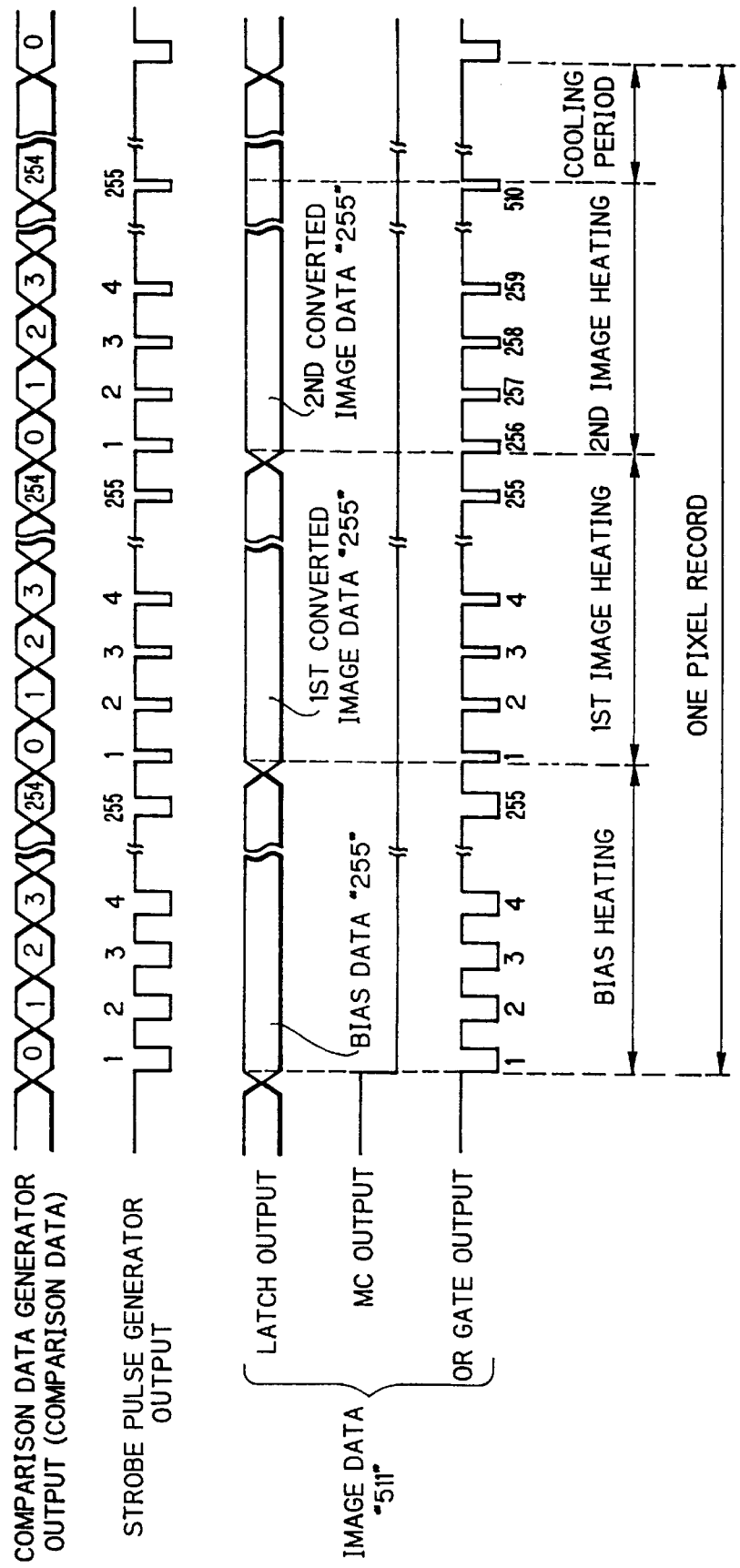

After heating with the first bias drive pulse, the print controller sequencer 25 increments the counter of the comparison data generator 38 to generate comparison data "1". The comparator array 42 compares the comparison data "1" with each pixel data set of one line bias data already latched by the latch array 42, and outputs one line drive data. With the process described above, the second bias drive pulses of one line indicated by a numeral "2" in FIGS. 9A–9C are generated which drive the heating elements 45a to 45m of the heating element array 26a at the same time.

Similarly, the third to 255-th bias drive pulses are generated by using the comparison data "2" to "254" to drive the heating elements 45a to 45m. In this manner, each heating element 45a to 45m of the heating element array 26a is heated 255 times during the bias heating period, and generates a bias heating energy Eby immediately before the yellow thermosensitive coloring layer 13 develops color, to supply it to the one line of the color thermosensitive recording sheet 10.

During this bias heating period, the print control sequencer 25 starts a first heating sequence of the image heating. The print control sequencer 25 switches the selector 35 to connect CPU 34 to the head driver 36, and instructs CPU 34 to perform an image data conversion process. Upon this instruction, CPU 34 fetches the count value J (="1") of the counter 34c.

Next, the print control sequencer 25 sequentially reads a pixel data set of the first line of the yellow image data from the image line memory 32, and sends it to CPU 34. The first pixel of the first line of the yellow image data is first input to CPU 34. In accordance with the image data conversion process illustrated in FIG. 5, CPU 34 executes a conversion process for the 9-bit yellow image data of the first pixel.

If the yellow image data of the first pixel is larger than a number "J×N", CPU 34 outputs 8-bit first converted image representative of a number "N", irrespective of the number of the yellow image data. In this case, the count value J is "1" and N="255", so that if the value of the yellow image data is equal to or larger than "256", 8-bit first converted image data representative of the number "255" is output.

If it is judged that the value of the yellow image data is in the range from "0" (=(J−1)×N) to "255" (=J×N), CPU 34 outputs 8-bit first converted image data having a value subtracted from the value of the yellow image data by the number "(J−1)×N", i.e., "0". For example, if the value of the yellow image data is "255", first converted image data of "255" is output. If the value is "128", first converted image data of "128" is output, and if the value if "0", first converted image data of "0" is output.

The first converted image data of the first pixel is supplied from CPU 34 to the shift register 40 of the head driver 36.

After the first converted image data of the first pixel is fetched, the 9-bit yellow image data of the second pixel of the first line is read and supplied to CPU 34. With the same conversion process as the yellow image data of the first pixel, the yellow image data of the second pixel is converted into first converted image data and latched by the shift register 40.

Similarly, the yellow image data of the third to last pixels of the first line is sequentially read from the image line memory 32 and supplied to CPU 34, and the first converted image data of the third to last pixels are latched by the shift register 40. This latch of the first converted image data is completed before the end of the bias heating.

After the bias heating of the yellow image of the first line is completed, the first converted image data fetched by the shift register 40 is latched by the latch array 41, in place of the bias data, in response to the latch signal, and sent to the comparator array 42. This latch signal increments the count value J of the counter 34c to "2".

Each magnitude comparator 42a to 42m compares the comparison data "0" first with first converted image data of each pixel. If the first converted image data is larger than the comparison data, each magnitude comparator 42a to 42m outputs drive data of "L level", and if smaller or equal, drive data of "H level" is output. Drive data of one line is output from the comparator array 42 in parallel to the gate array 43.

The drive data generated through comparison between the first converted image data and the comparison data "0" and supplied to the gate array 43 is subjected to a sum operation with the yellow image heating strobe pulse to generate an image drive pulse. If the drive data is of "H level", the image drive pulse is not generated. The one line image drive pulses selectively drive and heat the heating elements 45a to 45m. The first drive pulse is indicated by a numeral "1" in FIGS. 9A–9C.

Similarly, by using the comparison data of "1" to "254", the image drive pulses are generated to selectively drive the heating elements 45a to 45m. The pulse width of the image drive pulse is generally a half of the width when a pixel is printed only by one heating sequence.

In this manner, each heating element 45a to 45m is driven during one heating sequence as many times as that corresponding to the value of first converted image data in the range from 0 to 255 times. Therefore, during the first heating sequence, a heating element for a pixel having the value of "256" or larger of the yellow image data is driven by 255 image drive pulses including the first to 255-th pulses. A heating element for a pixel having the value of "255" or smaller of the yellow image data is driven by image drive pulses corresponding in number to the number of the first converted yellow image data. If the image data has the number "0", the corresponding heating element is not driven.

During the image heating by the first converted image data, the print control sequencer 25 starts a second heating sequence. The print control sequencer 25 instructs CPU 34 to start the image conversion process. Upon this instruction, CPU 34 fetches the count value J (="2") of the counter 34c. Next, the print control sequencer 25 sequentially reads again a pixel data set of the first line of the yellow image data from the image line memory 32, and sends it to CPU 34.

During the second heating sequence, CPU 34 compares the yellow image data of the first pixel with the number "J×N". In this case, since the count value J is "2", CPU 34 compares the yellow image data with the number "510". If yellow image data has a number in excess of "510", i.e., takes the number "511", CPU 34 outputs second converted data of "255".

Next, CPU 34 compares the yellow image data with the number "255" (=(J−1)×N). If the number of the yellow image data is from "255" to "510", CPU 34 outputs 8-bit second converted image data which is equivalent to the yellow image data having the number "255 (=(J−1)×N) Subtracted therefrom. Namely, a difference between the 9-bit yellow data and the first converted image data is output.

For example, if the yellow image data has the value "255" or smaller, second converted image data of "0" is output. If the value is "256", second converted data of "1" is output, and if the value is "510", second converted image data of "255" is output. If the image data has the value smaller than "255", second converted image data of "0" is output. Such second converted image data is fetched by the shift register 40 of the head driver 36.

Similarly, the yellow image data of the second and following pixels of the first line is sequentially converted into second converted image data which is then fetched by the shift register 40. This fetch of the second converted image data is completed before the end of the image heating by the first converted image data.

After the image heating by the first converted image data of the first line yellow image is completed, the second converted image data fetched by the shift register 40 is latched by the latch array 41, in place of the first converted image data, in response to the latch signal, and sent to the comparator array 42. This latch signal increments the count value J of the counter 34c to "0".

Similar to the image heating by the first converted image data, by using the comparison data from "0" to "254", the image drive pulses are generated to selectively drive the heating elements 45a to 45m. In this manner, each heating element 45a to 45m is driven during the second heating sequence by as many times as that corresponding to the second converted image data in the range from 0 to 255 times.

With the two heating sequences, as shown in FIG. 6, each heating element is driven as many times as that corresponding to the 9-bit yellow image data to generate the corresponding image heat energy Egy.

In the above manner, each heating element 45a to 45m generates a coloring heat energy having a constant bias heating energy Eby and the image heating energy Egy corresponding to the yellow image data. Therefore, the yellow thermosensitive coloring layer 13 forms a dot by developing color in a square pixel PS to a density corresponding to the yellow image data, in accordance with the characteristic curve shown in FIG. 2. In this manner, each pixel PS of the first line of the yellow image can be expressed at one of 0 to 510 tonal levels represented by the yellow image data.

After the completion of the image heating, each heating element 45a to 45m is cooled during a cooling period. This cooling period becomes longer as the number of image drive pulses becomes larger. During this cooling period, printing the second line of the yellow image starts. First, the selector 35 is switched to supply one line bias data read from the bias line memory 33 to the head driver 36. After the cooling period of the first line, the bias heating is performed using the bias data, in the manner described above.

Similar to the first line, during the bias heating period of the second line, a first heating sequence of the image heating starts for the second line. After the bias heating, first converted image data generated from the yellow image data of the second line selectively drives the heating elements 45a to 45m. During the image heating by the first converted image data, a second heating sequence of the image heating starts for the second line. After the image heating by the first converted image data, second converted image data generated from the yellow image data of the second line selectively drives the heating elements 45a to 45m.

Similarly, after printing the second line, the third and following lines of the yellow image are sequentially printed. After printing the yellow image, ultraviolet rays of 420 nm are applied from the yellow optical fixer 27 to the color thermosensitive recording sheet 10 to optically fix the yellow thermosensitive coloring layer 13.

When the front end of the recording area of the color thermosensitive recording sheet 10 reaches again the position of the thermal head 26, printing the first line of the magenta image starts. In printing the first line of the magenta image, a bias heating energy Ebm is generated by heating each heating element 255 times by using the bias drive pulses generated from the bias data of the bias line memory 33 and the magenta bias strobe pulses. Since the bias heating energy of the magenta thermosensitive coloring layer 12 is larger than the yellow thermosensitive coloring layer 13, strobe pulses having a wider width than that for the yellow image are used to generate the bias drive pulses with a wider pulse width.

After the bias heating, the image heating is carried out. For the magenta image heating, similar to printing the yellow image, 9-bit one line magenta image data is read from the magenta image memory 30b during the bias heating and temporarily stored in the image line memory 32. Next, each pixel data set of the one line magenta image data is read from the image line memory 32 and supplied to CPU 34 whereat the data is converted into 8-bit first converted image data. The image drive pulses generated from the one line first converted image data selectively drive the heating elements 45a to 45m.

During the heating sequence by the first converted image data, each pixel data set of the one line magenta image data is sequentially read again from the image line memory 32 and sent to CPU 34 whereat the data is converted into second converted image data. After the image heating by the first converted image data, the image drive pulses are generated from the second converted image data to selectively drive the heating elements 45a to 45m. In this manner, the image heating energy Egm corresponding to the 9-bit magenta image data is applied to the color thermosensitive recording sheet 10 to print the first line of the magenta image superposed upon the first line of the yellow image. Similarly, the second and following lines of the magenta image is printed on the color thermosensitive recording sheet 10.

After printing the magenta image, ultraviolet rays of 365 nm are applied from the magenta optical fixer 28 to the color thermosensitive recording sheet 10 to optically fix the magenta thermosensitive coloring layer 12.

After printing the magenta image, a cyan image is printed in the similar manner described above. Since the bias heating energy Ebc of the cyan thermosensitive coloring layer 11 is larger than the magenta thermosensitive coloring layer 12, heating strobe pulses having a wider width than that for the yellow image are used.

After three color images are printed in the above manner, the color thermosensitive recording sheet 10 is ejected out of the thermal printer. This color thermosensitive recording sheet 10 having been printed with a full-color image having 0 to 510 tonal levels for each color.

Each heating element can be heated at a maximum of 255 times during one heating sequence. Therefore, the number of heating times for two heating sequences is 510. In order to obtain the total number of heating times of 511 for the image data of "511" with 512 tonal levels, three heating sequences are required. During the third heating sequence, the number of heating times is 1 only for the image data "511", and the number of heating times is 0 for the image data other than the image data of "511".

Although the third heating sequence can improve the gradation expression by one level, the print speed is lowered. In this example, therefore, even for the number of tonal levels 512, the heating sequence is performed two times omitting the third heating sequence. Therefore, as shown in FIG. 6, both the image data of "511" and "510" are printed with the same density.

If a comparator for generating drive data of "L level" when the image data is equal to or larger than the comparison data is used together with a comparison data generator for generating comparison data of "0" to "255", then each heating element can be heated at a maximum of 256 times during one heating sequence. In this case, if the image data has the value of "255" or smaller, it is heated once even during the second heating sequence. However, heating is not continuous at the heating data of "254" or smaller, so that it contributes hardly to coloring, rather it prevents the heating element from being cooled too much. As a result, for the 9-bit image data, image data of "0" to "511" can be printed by the two heating sequences.

In the above embodiment, image data of (K+n) bits is converted into converted image data of K bits in a software manner by using CPU. This conversion may be performed in a hardware manner as illustrated in FIGS. 10 and 11. In FIG. 10, reference numeral 50 represents an image data divider for dividing 9-bit image data read from the image line memory 32 into 8-bit first and second converted image data. The other circuit elements are similar to those shown in FIG. 3, and the description thereof is omitted, only with reference numerals being given in FIG. 10.

Referring to FIG. 11, the image data divider 50 is constituted by a first data selector 51 for outputting first converted image data, a second data selector 52 for outputting second converted image data, and an inverter (NOT gate) 53. As described earlier, one line image data is read twice from the image line memory 32. In the first data read, the print control sequencer 25 supplies a control signal of "H level" to select the first data selector 51 so that the 9-bit image data is converted into 8-bit first converted image data. In the second data read, the print control sequencer 25 supplies the control signal of "L level" to select the second data selector 52 so that the 9-bit image data is converted into 8-bit second converted image data.

The first data selector 51 has an A port 51a and a B port for parallel input of 8-bit data, a switch terminal (A/bar B) 51c for selecting one of the A and B ports 51a and 51b, a C port 51c for parallel output of the selected 8-bit data, and a chip select (CS) terminal 51d for enabling or disabling the first data selector 51. Similarly, the second data selector 52 has an A port 52a, a B port 52b, a C port 52c, a CS terminal 52d, and a switch terminal 52c.

In the first data selector 51, A10 to A17 terminals of the A port 51a are all pulled up to "H level" so that all bits of input data are "1". Lower 8 bits D0 to D7 of the 9-bit image data are input from the image line memory 32 to B10 to B17 terminals of the B port 51b, and the highest bit D8 is input to the switch terminal 51e. The selector 35 is connected to the C port 51c, and the control signal from the print control sequencer 25 is input to the CS terminal 51d.

In the second data selector 52, lower 8 bits D0 to D7 of the 9-bit image data are input from the image line memory 32 to A20 to A27 terminals of the A port 52a, and the highest bit D8 is input to the switch terminal 52e. B20 to B27 terminals of the B port 52b are all pulled down to "L level" so that all bits of input data are "0". The selector 35 is connected to the C port 52c, and the control signal from the print control sequencer 25 is inverted by an inverter 53 and input to the CS terminal 52d.

The data selectors 51 and 52 output 8-bit data from the C ports 51c and 52c when the control signal of "H level" is input to the CS terminals 51d and 52d. The control signal is made "H level" during the first heating sequence to enable the first data selector 51 and output the first converted image data from the first data selector 51. During the second heating sequence, the control signal is made "L level" to enable the second data selector 52 and output the second converted image data from the second data selector 52.

If the signal input to the switch terminal 51e, i.e., the highest bit D8 of the image data, is "1", the first data selector 51 selects the A port 51a to output signal levels at the A10 to A17 terminals from the C port 51c. Specifically, in this case, first converted image data of all "1s" of the bits D10 to D17 is output from the C10 to C17 terminals of the C port 51c. If the highest bit D8 is "0", the first data selector selects the B port 51b to output signal levels at the B10 to B17 terminals from the C port 51c. In this case, the lower 8 bits D0 to D7 of the 9-bit image data are output as the bits D10 to D17 of the first converted image data.

Similarly, if the highest bit D8 of the image data input to the switch terminal 52e is "1", the second data selector 52 selects the A port 52a to output signal levels at the A20 to A27 terminals from the C port 52c. In this case, the lower 8 bits D0 to D7 of the 9-bit image data are output as the bits D20 to D27 of the second converted image data. If the highest bit D8 is "0", the second data selector selects the B port 52b to output signal levels at the B20 to B27 terminals from the C port 52c. In this case, all "0s" of the bits D20 to D27 are output as the second converted image data from the C20 to C27 terminals of the C port 52c.

As shown in FIG. 12, for the image data having the tonal level of "1255" or lower, the highest bit D8 of the 9-bit image data is "0". Therefore, during the first image heating sequence, the lower 8 bits D0 to D7 of the 9-bit image data are sent to the head driver 36 as the first converted image data to drive the heating elements as many times as that corresponding to the first converted image data. During the second image heating sequence, the second converted image data of all "0" of the bits B20 to B27 is sent to the head driver 30 so that the number of driving times of each heating element is 0. With the two heating sequences, each heating element is driven as many times as that corresponding to the number of the 9-bit image data.

For the image data having the tonal level of "256" or higher, the highest bit D8 of the 9-bit image data is "1". Therefore, during the first image heating sequence, the 8-bit first converted image data of all "1s" of the bits D10 to D17 is sent to the head driver 30 so that each heating element is heated 255 times. During the second image heating sequence, the lower 8 bits D0 to D7 of the 9-bit image data are sent to the head driver 36 as the second converted image data to drive the heating elements as many times as that corresponding to the value of the second converted image data.

As described previously, the head driver 36 generates drive data of "L level" to drive each heating element if the heating data is larger than the comparison data. Therefore, if the 9-bit image data has a number "256" or larger, the number of driving times of the heating element is smaller by one than the number of the 9-bit image data as shown in FIG. 12. For example, if the number of the 9-bit image data is "257", the first converted image data has a number "255" and the second converted image data has a number "1". In this case, the heating element is driven 256 times during the two heating sequences so that a dot is printed at a tonal level smaller by one than the normal level.

This reduction of the number of heating times can be eliminated by using: comparison data of "0" to "255"; a comparator for generating drive data of "L level" if the heating data is equal to or larger than the comparison data; and a circuit for forcibly setting the drive data to "H level" only when the comparison data is. "0" during the second image heating sequence.

An image data divider shown in FIG. 13 is improved so that the number of heating times is not reduced for the image data having the number "256" or larger. In this image data divider 50, a 1FF-1FE converter 56 and an adder 52 are provided additionally, and other circuit elements are the same as those shown in FIG. 11.

The 1FF-1FE converter 56 converts, if the 9-bit image data read from the image line memory 32 has a number "511" (1FF (hexadecimal)), the number "511" into a number "510" (1FE (hexadecimal)). The lower 8 bits D0 to D7 of the 9-bit image data are input from the 1FF-1FE converter 56 to the adder 57. The adder 57 outputs 8-bit image data representative of the input image data added with a number "1", and sends it to the A20 to A27 terminals of the second data selector 52.

For the 9-bit image data having a number "256" or larger, the adder 57 outputs a number corresponding to the lower 8 bits of the 9-bit image data added with the number "1", as the second converted image data. Therefore, the number of driving times of a heating element during the second heating sequence can be corrected.

If the nine-bit image data has a number "511", the adder 57 overflows to a 10-bit digit because it adds the number "1". The adder 57 which outputs 9-bit data outputs lower 9 bits of "0" among the 10-bit data. If the second converted image data is generated by using this image data, the number of the second converted image data is "0" and a dot is printed at a density of about half the normal density. In order to avoid this, prior to adding the number "1" at the adder 57, the 1FF-1FE converter 56 forcibly converts the 9-bit image data having the number "511" into 9-bit image data having the number "510".

In this embodiment, the first and second converted image data shown in FIG. 6 are generated so that each heating element can be heated as many times as that corresponding to the number of the 9-bit image data. Since the 9-bit image data having the number "511" is forcibly converted into the 9-bit image data having the number "510", the number of heating times is reduced by one.

FIGS. 14 to 19 illustrate an example wherein two heating sequences are performed for both the bias heating and image heating. In this example, the same sequences are used for both the bias heating and image heating, and so the heating control becomes easy.

Figure 14:
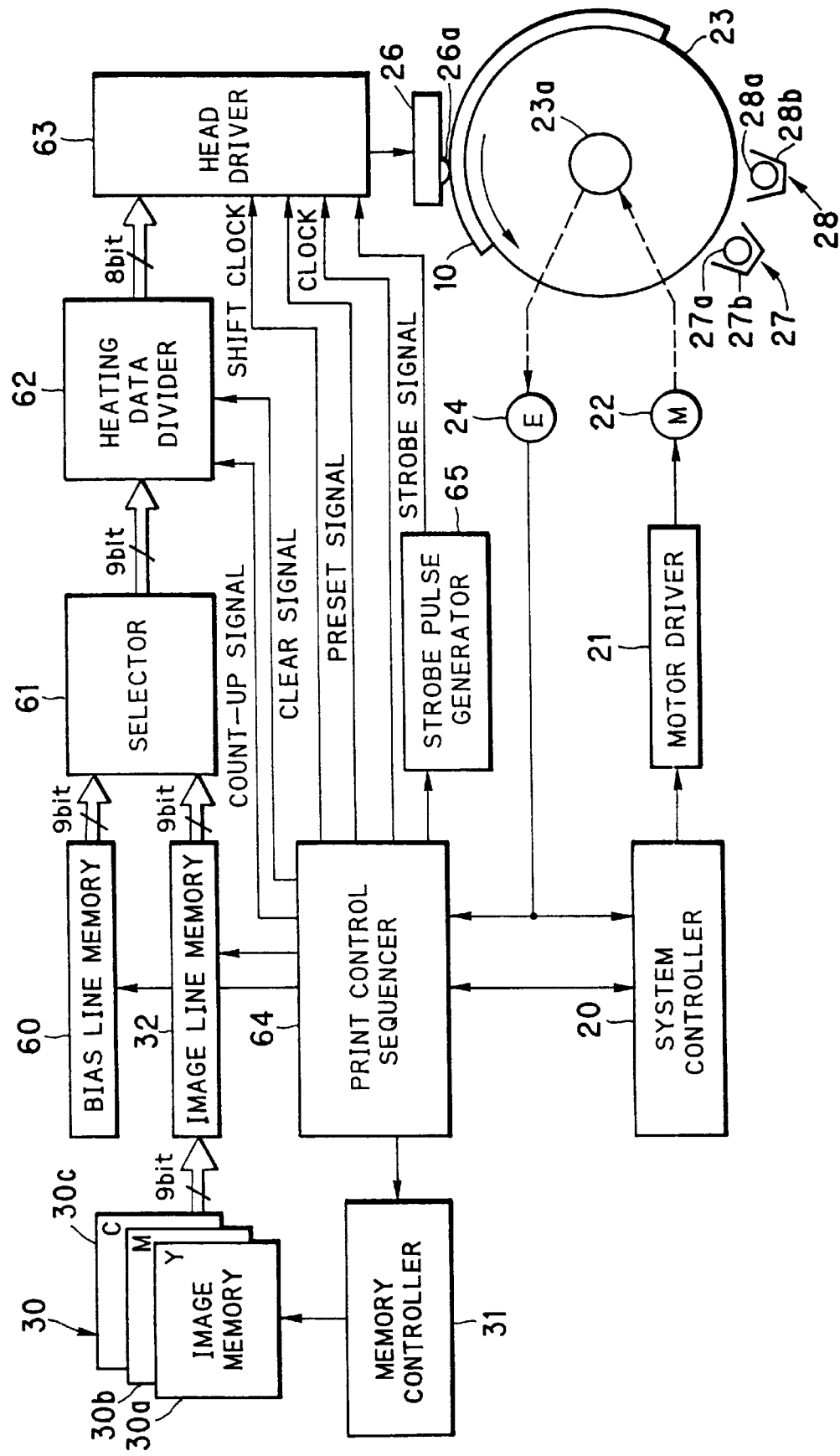
FIG. 14 is a schematic diagram showing the outline of a thermal printer in which the heating sequence is performed twice for both bias data and image data.

FIG. 14 shows the outline of a thermal printer. Circuit elements essentially the same as those shown in FIG. 3 are represented by using identical reference numerals, and the description thereof is omitted. In FIG. 14, the bias line memory 60 stores 9-bit bias data. In this example, bias data "510" is allocated to all heating elements. Obviously, different bias data may be allocated to each heating element while considering a variation of resistance values of heating elements.

During the bias heating, the selector 61 sends each pixel data set of one line bias data from the bias line memory 60 to the heating data divider 62. During the image heating, the selector 61 sends each pixel data set of one line image data from the image line memory 32 to the heating data divider 62. Reading the line memories 60 and 32 is performed twice for each line.

The heating data divider 62 converts the 9-bit heating data into 8-bit converted heating data and sends it to the 8-bit head driver 63. The print control sequencer 64 sequentially controls respective circuit elements.

The strobe pulse generator 65 generates a strobe pulse of "H level" if the heating element is made electrically conductive. This strobe pulse is generated 510 times for both the bias heating and image heating, but different pulse widths are used for the bias heating and image heating. Different pulse widths are also dependent upon print colors.

Figure 15:
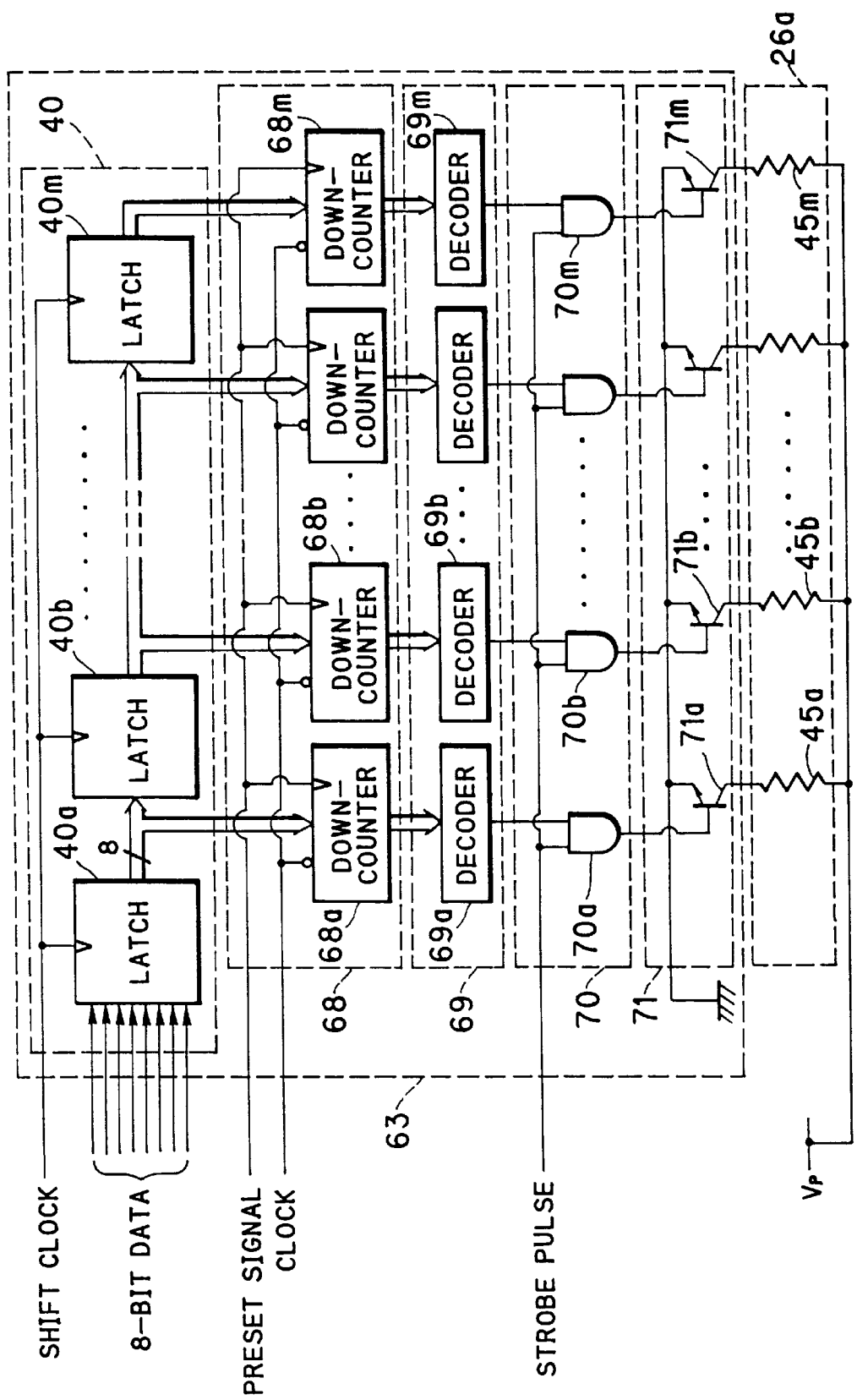
FIG. 15 is a circuit diagram of a head driver using a down-counter.

FIG. 15 shows the structure of the head driver 63. Circuit elements essentially the same as those shown in FIG. 4 are represented by using identical reference numerals. The head driver 63 is constituted by a shift register 40, a down-counter array 68, a decoder array 69, a gate array 70, and a drive circuit 71.

The down-counter array 68 is constituted by m down-counters 68a to 68m. In this down-counter array 68, the one line converted heating data from the shift register 40 is set to the down-counters 68a to 68m as their count values, in response to a preset signal from the print control sequencer 64. Each time a clock is input from the print control sequencer 64, each down-counter 68a to 68m decrements its count value by "1". The count value of each down-counter 68a to 68m is sent to the decoder array 69.

The decoder array 69 is constituted by m decoders 69a to 69m. Each of these decoders 69a to 69m outputs "H level" when the contents of a corresponding one of the down-counters 68a to 68m are "1" or larger in hexadecimal, and "L level" when "0". The gate array 70 is constituted by m AND gates 70a to 70m. Each AND gate 70a to 70m outputs "H level" when a strobe pulse is input while an output of a corresponding one of the decoders 69a to 69m takes "H level". The drive circuit 71 is constituted by m transistors 71a to 71m. Each transistor 71a to 71m turns on and outputs a drive pulse when a corresponding one of the AND gates 70a to 70m outputs "H level".

Each transistor 71a to 71m of the drive circuit 71 is connected to a corresponding one of the heating elements 45a to 45m of the heating element array 26. Each heating element 45a to 45m is heated by the drive pulse generated when a corresponding one of the transistors 44a to 44m is turned on.

Next, the heating data divider 62 will be described. The heating data divider 62 converts the 9-bit heating data into the 8-bit converted heating data under the following conversion conditions, where a number of the 9-bit heating data is represented by Z.

(1) If Z>J×N, it outputs 8-bit converted heating data representative of a number "N".

(2) If (J−1)×N<Z<J×N, it outputs 8-bit converted heating data representative of a number "Z−(J−1)×N".

(3) If Z<(J−1)×N, it outputs 8-bit converted heating data representative of a number "0".

In the above conversion conditions, the number J represents the number of heating sequences for one line print during the bias heating and image heating. The first heating sequence takes a number "1", and the second heating sequence takes a number "2". The number N represents a number same as the highest tonal level capable of being expressed by the head driver 63, and in this example, it is "255".

Figure 16:
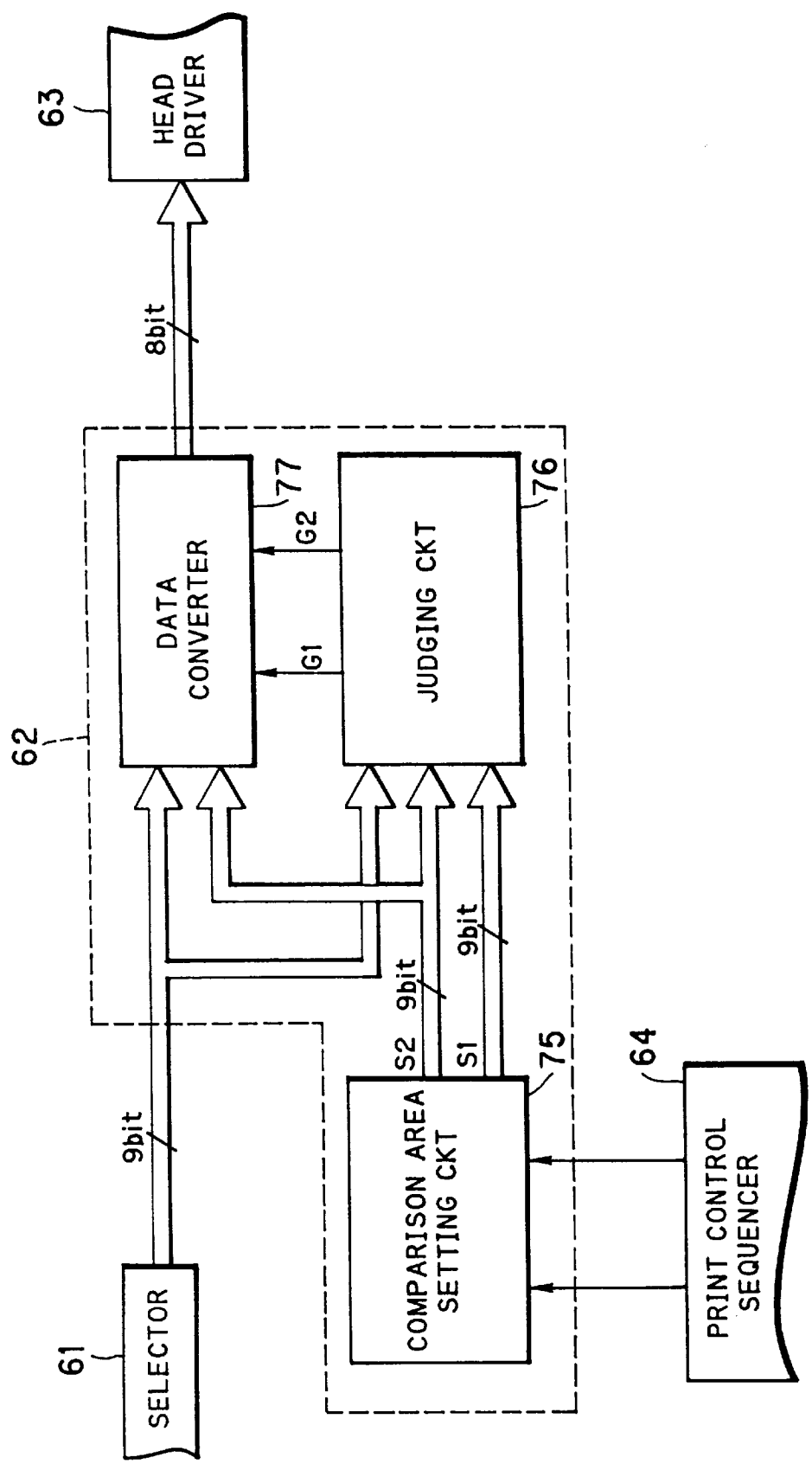
FIG. 16 is a block diagram of a heating data divider.

As shown in FIG. 16, the heating data divider 62 is constituted by a comparison area setting circuit 75, a judging circuit 76, and a data converter 77. The comparison area setting circuit 75 sets 9-bit standard data S1 representative of a number "J×N" and 9-bit standard data S2 representative of a number "(J−1)×N", for the conversion of the 9-bit heating data into converted heating data. This comparison area setting circuit 75 is cleared in response to a clear signal sent from the print control sequencer 64 for the first (J=1) heating sequence. Immediately, a count-up signal from the print control sequencer 64 is input to the comparison area setting circuit 75. Therefore, for the first heating sequence, the comparison area setting circuit 75 outputs standard data S1 and S2 at J=1. For the second heating sequence, the comparison area setting circuit 75 outputs standard data S1 and S2 at J=2, in response to the count-up signal input for the second time.

The judging circuit 76 compares the standard data S1 and S2 with the number Z of the 9-bit heating data, to judge whether the heating data falls in any one of the above conversion conditions (1) to (3). The judging circuit 76 sends judgement signals obtained from the judgement results to the data converter 77. In accordance with the judgement signals, the data converter 77 outputs the 8-bit converted heating data matching the conversion condition, to the head driver 63. If the number Z of the heating data corresponds to the conversion condition (2), the data converter 77 is input with the heating data and the standard data S2 from the comparison area setting circuit 75 in order to obtain the number "Z−(J−1)×N".

Figure 17:
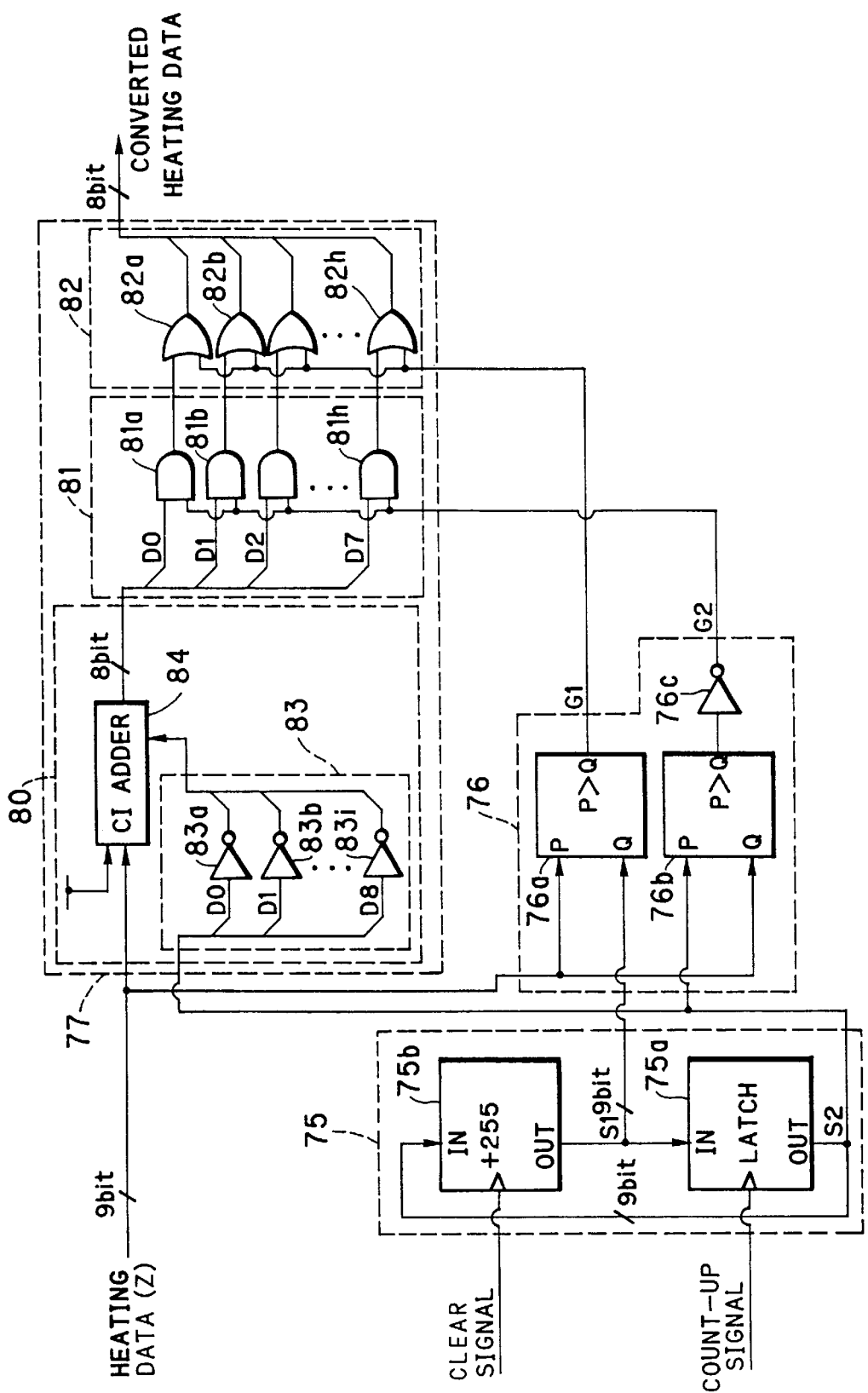
FIG. 17 is a circuit diagram showing an example of the structure of the heating data divider shown in FIG. 16.

FIG. 17 shows a concrete circuit of the heating data divider 62. The comparison area setting circuit 75 is constituted by a 9-bit input/output latch 75a and an adder 75b for adding the number N (=255) to the 9-bit data. The latch 75a is connected to an output terminal of the adder 75b, and the adder 75b is connected to an output terminal of the latch 75a. The adder 75b outputs the standard data S1, and the latch 75b outputs the standard data S2. The latch 75a latches an output from the adder 75b in response to a count-up signal, and the adder 75b is reset to "0" in response to a clear signal.

During the first (J=1) heating sequence, in response to the clear signal, the adder 75b is reset to the standard data S2 having a number "0" (=(J−1)×N). When the count-up signal is input to the latch 75a, the standard data S2 is latched therein. The adder 75b outputs a number "255" obtained by adding the output number "0" of the latch 75b to a number "255", as the standard data S1 (=J×N). During the second (J=2) heating sequence, in response to the count-up signal, the number "255" output from the adder 75b is latched by the latch 75a. Namely, the latch 75a outputs the standard data S2 having the number "(J−1)×N" at J=2. The adder 75b outputs the standard data S1 having the number "J×N" at J=2, i.e., a number "510" obtained by adding a number "255" to the output number "255" from the latch 75a.

The judgment circuit 76 is constituted by first and second 9-bit magnitude comparators 76a and 76b and a NOT gate 76c. To a P terminal of the first magnitude comparator 76a, the 9-bit heating data is input, and to a Q terminal thereof, the standard data S1 from the comparison area setting circuit 75 is input. To a P terminal of the second magnitude comparator 76a, the standard data S2 from the comparison area setting circuit 75 is input, and to a Q terminal thereof, the heating data is input. If a number of the data input to the P terminal is larger than a number of the data input to the Q terminal, the magnitude comparators 76a and 76b output an "H level" signal, whereas if equal or smaller, an "L level" signal is output.

An output of the first magnitude comparator 76a is sent as a judgement signal G1 to the data converter 77, and an output of the second magnitude comparator 76b is inverted by the NOT gate with respect to its logic (signal level) and sent as a judgement signal G2 to the data converter 77. Under the conversion condition (1), the signal levels of the judgement signals G1 and G2 are a combination of "H level" and "L level". Under the conversion condition (2), they are a combination of "L level" and "H level", and under the conversion condition (3), they are a combination of "L level" and "L level".

The data converter 77 is constituted by a subtractor 80, an AND gate array 81, and an OR gate array 82. The subtractor 80 is used for obtaining converted heating data having the number "Z−(J−1)×N" when the number Z of the 9-bit heating data satisfies the conversion condition (2), and is input with the 9-bit standard data S2 (="(J−1)×N") from the comparison area setting circuit 75 and with the 9-bit heating data. The subtractor 80 is constituted by an inverter array 83 made of nine NOT gates 83a to 83i and a 9-bit input adder 84. The adder 84 is input with the heating data, the standard data S2 with each bit being inverted, and a carry input, and obtains the number "Z−(J−1)×N" which is the number of the heating data subtracted by the number of the standard data S2. Since the number obtained by the adder 84 never takes a number 256 or larger (9 bits or larger), the lower 8 bits can be obtained which are sent to the AND gate array 81.

The AND gate array is used for forcibly setting the number of the converted heating data to a number "0" if the heating data satisfies the conversion condition (3), and is constituted by eight AND gates 81a to 81h. Each AND gate 81a to 81h is inputted with one bit of the 8-bit data from the subtractor 80 and the judgement signal G2 from the judging circuit 76. The OR gate array 82 is used for forcibly setting the number of the converted heating data to "255" if the heating data satisfies the conversion condition (2), and is constituted by eight OR gates 82a to 82h. Each OR gate 82a to 82h is input with one bit of the 8-bit data from the AND gate array 81 and with the judgement signal G1 from the judging circuit 76.

With the data converter 80 constructed as above, if the number Z of the 9-bit data is larger than the number "J x N" (conversion condition (1)), the judgement signal G1 becomes "H level" and the judgement signal G2 becomes "L level". In this case, the OR gate array 82 outputs 8-bit converted heating data with each bit being set to "H level" by the eight judgement signals G1. This converted heating data indicates the number "255". Therefore, the conversion condition (1) neglects the data output from the AND gate array 81.

If the number Z of the 9-bit data is in the range equal to or larger than the number "(J−1)×N" and smaller than or equal to the number "J×N" (conversion condition (2)), the judgement signal G2 becomes "H level" and the judgement signal G1 becomes "L level". In this case, the 8-bit data having the number "Z−(J−1)×N" output from the subtractor 80 is output via the AND gate array 81 and OR gate array 82. Therefore, the conversion condition (2) outputs the 8-bit converted heating data representative of the number "Z−(J−1)×N" supplied from the subtractor 80.

If the number Z of the 9-bit data is smaller than the number "(J−1)×N" (conversion condition (3)), the judgement signals G1 and G2 become "L level". In this case, the 8-bit converted heating data with each bit being set to "0" is output. This 8-bit converted heating data indicates a number "0". Therefore, data output from the subtractor 80 is neglected.

With this heating data divider 62, similar to that shown in FIG. 5, the 9-bit heating data is converted to the first and second 8-bit converted heating data, and each heating element is heated during the two heating sequences as many times as that corresponding to the number Z of the 9-bit heating data.

Although the heating data divider 62 is structured by hardware, this heating data divider 62 may be realized by software by providing a microcomputer with the functions of the comparison area setting circuit, judgement circuit, and data converter.

Figure 18:
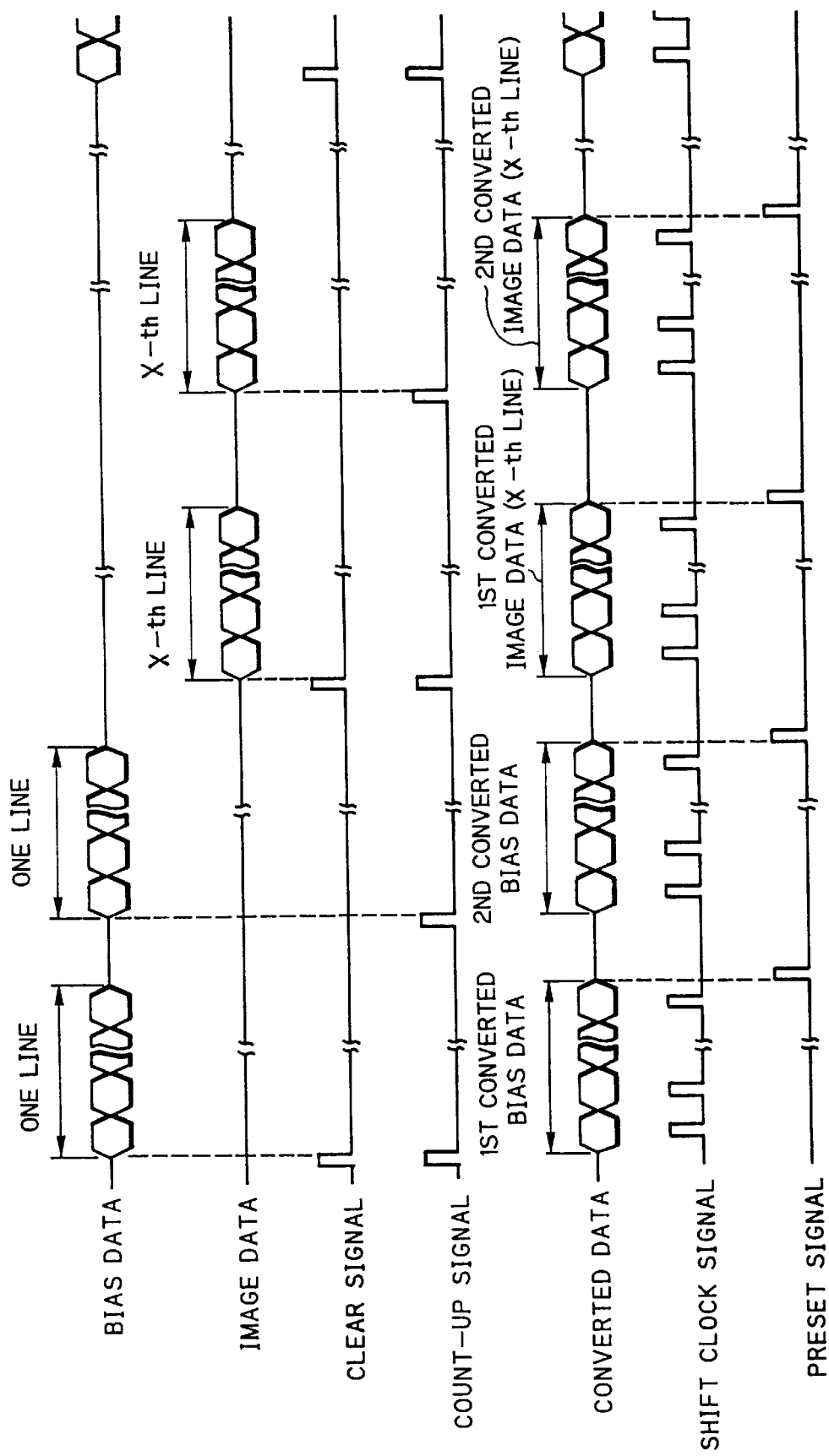
FIG. 18 is a timing chart illustrating data conversion by the thermal printer shown in FIG. 14.
Figure 19:
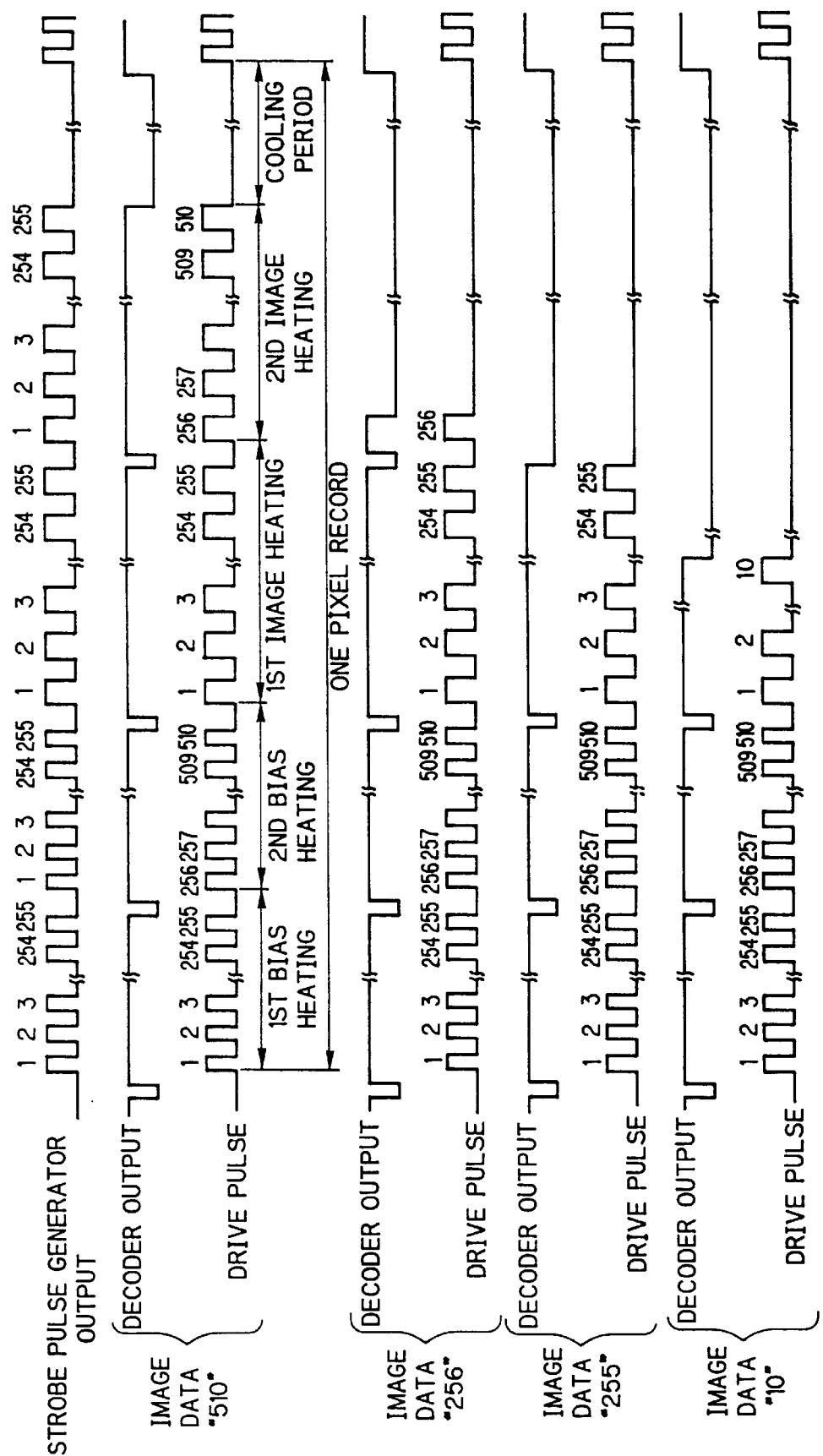
FIG. 19 is a timing chart illustrating the operation of the head driver shown in FIG. 15.

The thermal printer illustrated in FIGS. 14 to 17 operates as illustrated in FIGS. 18 and 19. In printing the X-th line of an image, first the 9-bit one line bias data is read twice from the bias line memory 60. Each bias pixel data of one line read at the first time is converted into the 8-bit first converted bias data by the heating data divider 62. The first converted bias data of one line is sent to the head driver, and preset to the down-counter array 68 via the shift register 40.

The count value of the down-counter array 68 is decremented in response to the clock. Since each heating element is maintained ready until the count value of the down-counter becomes "0", the heating element is heated as many times as that corresponding to the preset first converted bias data. Since the bias data is given "510", all the first converted bias data have the number "255". Therefore, all the heating elements are each heated 255 times during the first heating sequence.

The bias data of one line read at the second time is converted into the second converted bias data of one line by the heating data divider 62. Since the second converted bias data is "255", all the heating elements are heated 255 times during the second heating sequence. Therefore, all the heating elements are heated "510" times by executing the first and second heating sequences.

After the bias heating is completed, the image heating is performed. Also in this image heating, the X-th line image data is read twice from the image line memory 32 and converted into the first and second converted image data. The 8-bit head driver 63 executes two heating sequences, and each heating element is heated the same number of times as the number of the 9-bit image data as illustrated in FIG. 19.

Next, printing the (X+1)-th line starts. Also in this case, the bias heating is carried out by the two heating sequences, and the image heating is carried out by the two heating sequences. In this manner, an image of one color is printed on a color thermosensitive recording sheet 10 one line after another. As described before, a full-color image is recorded through a three-color frame sequential scheme, on the color thermosensitive recording sheet 10.

In the example described above, the conversion condition is classified into Z>J×N, (J−1)×N<Z<J×N, and Z<(J−1)×N. If J×N=Z, then Z−(J−1)×N=N, and if (J−1) ×N=Z, then Z−(J−1)×N=0. Therefore, the equality condition is not limited thereto, but the following conversion methods I to III may be used.

Conversion method I (1) If $Z \geq J \times N$, 8-bit converted heating data representative of a number "N" is output.

(2) If $(J-1) \times N \leq Z < J \times N$, 8-bit converted heating data representative of a number "$Z-(J-1) \times N$" is output.

(3) If $Z \leq (J-1) \times N$, 8-bit converted heating data representative of a number "0" is output.

Conversion method II (1) If $Z > J \times N$, 8-bit converted heating data representative of a number "N" is output.

(2) If $(J-1) \times N < Z \leq J \times N$, 8-bit converted heating data representative of a number "$Z-(J-1) \times N$" is output.

(3) If $Z \leq (J-1) \times N$, 8-bit converted heating data representative of a number "0" is output.

Conversion method III (1) If $Z \geq J \times N$, 8-bit converted heating data representative of a number "N" is output.

(2) If $(J-1) \times N < Z < J \times N$, 8-bit converted heating data representative of a number "$Z-(J-1) \times N$" is output.

(3) If $Z \leq (J-1) \times N$, 8-bit converted heating data representative of a number "0" is output.

In converting the 9-bit data into 8-bit converted data by using any one of the above three conversion methods, the judgement signals G1 and G2 matching the conversion conditions can be obtained by changing the input conditions and output logic of the 9-bit data and standard data S1 and S2 input to the first and second magnitude comparators 76a and 76b of the judging circuit 76. Further, without using the magnitude comparators, two adders (subtractors) may be used as the judging circuit 76 to obtain the numbers "$Z-(J-1) \times N$" and "$Z-J \times N$" and use signals corresponding to the positive or negative values of these numbers as the judgement signals G1 and G2.

As the data converter 77, a gate array for forcibly setting the converted heating data to "N" and a gate array connected at the output stage of the former gate array for forcibly setting the converted heating data to "0" may be used, depending upon the logic output conditions of the judgement signals G1 and G2. Furthermore, a selector may be used for selectively outputting the numbers "0", "N", and "$Z-(J-1) \times N$".

In the embodiment illustrated in FIGS. 14 to 19, each heating element can be heated 255 times by one heating sequence and the maximum number of heating times during the two heating sequences is 510. Therefore, the number of heating times of the heating data "511" is 510 same as the heating data "510" so that the number of tonal levels is smaller by one level than the tonal level levels 512 of 9 bits.

Therefore, if the 512 tonal levels are to be expressed, the number P of heating sequences is 3. Since M corresponds to the maximum number "511" of 9 bits, the number P is the same as that obtained from P=2n+1.

If the heating sequence is performed three times, the heating data is read from the line memory three times, and the data converter converts the heating data into first to third converted heating data. The strobe pulse generator generates 255 strobe pulses during each of the first and second heating sequences. During the third heating sequence, however, only one strobe pulse is generated so as to shorten the print time.

Figure 20:
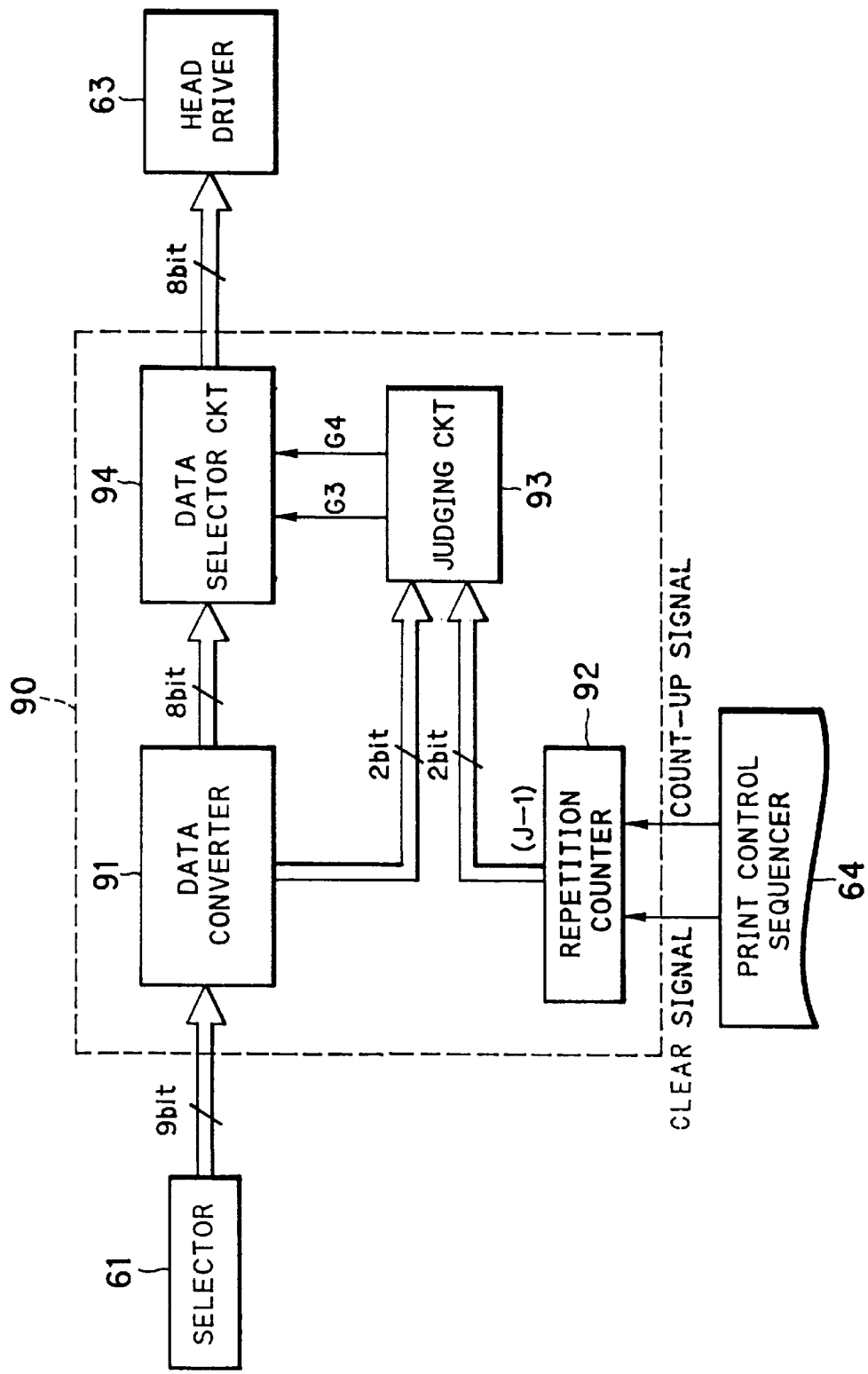
FIG. 20 is a block diagram showing another example of the heating data divider.

For the execution of the heating sequence three times for 512 tonal levels, the thermal printer shown in FIGS. 14 and 15 can be used. The operation of executing the heating sequence three times will be described with reference to a thermal printer illustrated in FIGS. 20 to 23 although this printer is also used for executing the heating sequence twice. A heating data divider 90 shown in FIG. 20 converts the 9-bit heating data into first to third 8-bit converted heating data. This heating data divider 90 is constituted by a repetition counter 92, a data converter 91, a judgement circuit 93, and a data selector 94.

Immediately before the execution of the first heating sequence, i.e., immediately before the start of reading data from the line memory at the first time, the repetition counter 92 is reset by a clear signal from the print control sequencer 62. Each time a heating sequence is completed, the repetition counter 92 counts up a count-up signal supplied from the print control sequencer 62. Therefore, the repetition counter 92 outputs a count value of (J–1) at the J-th heating sequence.

The data converter 91 converts the 9-bit image data into addition data representative of an 8-bit number S and 2-bit reference data representative of a number R, in accordance with the conditions (c) and (d) to be described later. The judgement circuit 93 compares the reference data with the count value to judge which is larger. The data selector 94 selects one of three types of 8-bit data including a number "0", addition data from the data converter 91, and a number "255", in accordance with the judgement result by the judgement circuit 93, and sends it as the converted heating data to the 8-bit head driver 63 shown in FIG. 15.

Next, the conversion process by the heating data divider 90 will be described. Representing the numbers of the highest bit of the 9-bit data and the lower 8 bits by r and s, respectively, the number Z of the 9-bit image data can be given by the following equation (a):

$$\begin{aligned} Z &= 2^8 \times r + s \\ &= 255 \times r + (2^8 - 255) \times r + s \\ &= 255 \times r + r + s \end{aligned} \quad (a)$$

If the heating sequence is repeated R times and each heating element is driven by S times at the next heating sequence to drive the heating element by the same time as the number Z of 9 bits, then the following equation (b) stands:

$$Z = 255 \times R + S \quad (b)$$

By substituting the numbers r and s, the numbers R and S of the equation (b) are given by:

if $r+s \leq 255$, then $R=r$, $S=r+s$ \quad (c)

and if $r+s > 255$, then $R=r+1$, $S=r+s-255$ \quad (d)

For the J-th heating sequence, the 9-bit heating data is converted into the numbers R and S in accordance with the above conditions (c) and (d). If the number R is larger than the number (J–1), the heating element is driven by the 8-bit converted heating data representative of the number "255". If the number (J–1) is equal to the number R, the heating element is driven by the 8-bit converted heating data representative of the number S. If the number R is smaller than the number (J1), the heating element is driven by the 8-bit converted data representative of the number "0".

Therefore, at the J-th heating sequence, the 9-bit heating data is converted into the 8-bit converted data in accordance with the following conditions:

If R<J−1, converted image data representative of the number "0" is output;

if R=J−1, converted image data representative of the number "S" is output; and if R>J−1, converted image data representative of the number "255" is output.

Figure 21:
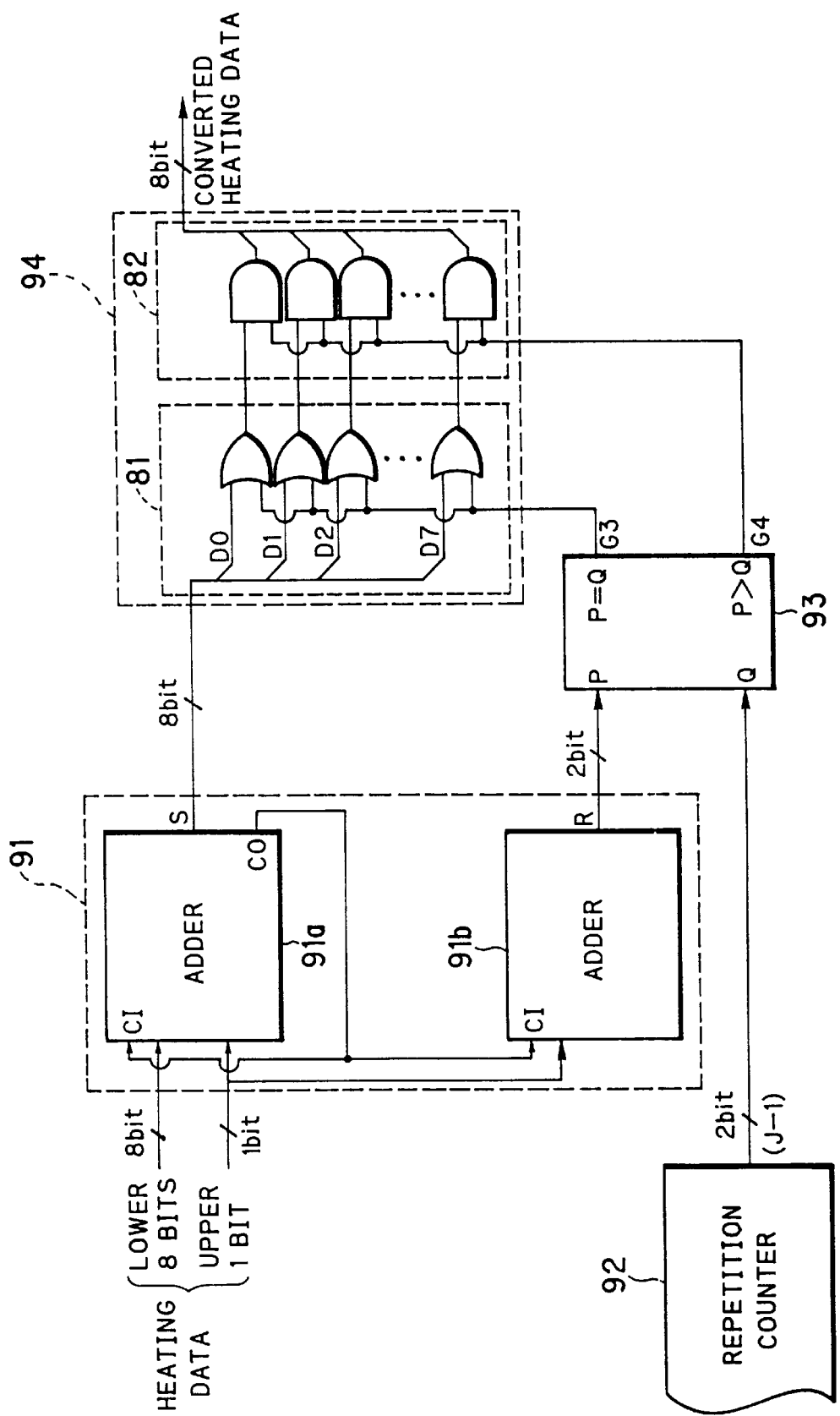
FIG. 21 is a circuit diagram showing another example of the structure of the heating data divider shown in FIG. 20.

A particular example of the heating data divider 90 is shown in FIG. 21. The data converter 91 is constituted by a first adder 91a and a second adder 91b. The first adder 91a is configured to input and output 8 bits. The lower 8 bits of the 9-bit image data is input to one input port of the first adder 91a and the highest bit thereof is input to the other input port. The first adder 91a calculates an addition value of the number r represented by the highest bit of the image data and the number s represented by the lower 8 bits. If the addition value is 255 or smaller, the first adder 91a outputs 8-bit addition data representative of the number S (=r+s) for r+s≦255 (condition (c) above).

If the addition value of the numbers r and s is "256" or larger, i.e., if r+s>255 (condition (d) above), it is necessary for the first adder 91a to output the 8-bit addition data representative of S=r+s−255. Since the data converter 91 outputs 8-bit data, the number S (=r+s−255) subtracted by the number "255" from the addition value (=r+s) is adapted to be obtainable through a carry operation. To this end, a carry output terminal (CO) of the first adder 91a is connected to a carry input terminal (CI) of the first adder 91a itself. Therefore, if the addition value is "256" or larger, the carry signal output from the carry output terminal (CO) is input to the carry input terminal (CO) of the first adder 91a itself. In this manner, in the case of r+s>255, the first adder 91a outputs 8-bit addition data (=S) representative of the number S (=r+s−255).

Therefore, the first adder 91a outputs the 8-bit addition data of the number S (=r+s, or r+s−255) and sends it to the data selector 94.

The second adder 91b is used for setting R=r+1 if the addition value of the numbers r and s is "256" or larger. The highest bit of the 9-bit heating data is input to one input terminal of the second adder 91b, and a carry signal from the first adder 91a is input to a carry input terminal (CI) of the second adder 91b. With this interconnection, if the addition value of the numbers r and s is "255" or smaller, the second adder 91b outputs the reference data having a number same as the number of the lowest bit of the 9-bit heating data, and if the addition value is "256" or larger, it outputs the reference data having a number added "1" to a number of the lowest bit of the 9-bit heating data, in response to the carry signal from the first adder 91a. If the 9-bit hating data is used, the maximum number of the reference data is "2" so that the second adder 91a may be a two-bit output adder for outputting the 2-bit reference data.

The judging circuit 93 is constituted by a magnitude comparator having two-bit P and Q input terminals same as the bit number of the reference data, and judges the magnitude and equality states of the data input to the P and Q terminals. The reference data is input to the P terminal of the magnitude comparator and the count data from the repetition counter 92 is input to the Q terminal. If the former and latter have the same data, a judgement signal G3 output from a P=Q terminal is set "H level", whereas if the former is larger than the latter, a judgement signal G4 output from a P>Q terminal is set "H level". These judgement signals G3 and G4 are sent to the data selector 94. In other cases, the judgement signals G3 and G4 become "IL level".

Like that shown in FIG. 17, the data selector 94 is constituted by an AND gate array 81 and an OR gate array 82. If the number R of the reference data is smaller than the count value (J−1), the judgement signals G3 and G4 are both "L level". Therefore, the heating data from the first adder 91a is forcibly set to the number "0". If the number R of the reference data is larger than the count value (J−1), the judgement signal G4 is "H level" and the judgement signal G3 is "L level". Therefore, the heating data is forcibly set to the number "255". If the number R of the reference data is equal to the count value (J−1), the judgement signal G3 is "H level" and the judgement signal G4 is "L level". Therefore, the number S from the first adder 91a is output from the judgement circuit 94 as the converted heating data.

FIG. 22 shows the relationship among the heating data, first to third heating data, and the number of driving times of each heating element, in the case where the heating data divider 90 is used.

As shown in FIG. 23, in printing one dot, the bias heating and image heating are carried out to record a dot having a desired density in a pixel area. The 9-bit bias data of "510" is used which is converted into 8-bit first to third converted bias data. By using the three converted bias data, three heating sequences are executed during the bias heating period.

During the first and second heating sequences, the number of strobe pulses is "255", and during the third heating sequence, the number of strobe pulses is "1". With the three heating sequences, each heating element is heated 510 times. With the bias data of "510", the third converted bias data is "0" so that the heating sequences may be limited to twice. The bias data of "511" may be used, or the bias data of "255" may be used to limit the heating sequence to only one.

Also for the image heating, the 9-bit image data is converted into first to third converted image heating data to execute the heating sequence three times. If the image data of "511" is used, each heating element is heated 511 times. In this embodiment, if the number of heating sequences is limited to two, the maximum number of heating times is "510" similar to the embodiment shown in FIGS. 14 to 19. Therefore, even if the image data of "511" is used, the number of heating times is limited to "510". If the number of heating times is 2 and the number of strobe pulses during the second heating sequence is set to, for example, 145, the maximum number of heating times can be limited to "400".

In the above example, the data converter 91 converts the heating data so that R=r and S=r+s for r+s≦255, and R=r+s and S=r+s−255 for r+s>255. However, if r+s=255, both are satisfied so that the numbers R and S may be given by:

If r+s<255, then R=r, S=r+s.

If r+s ≧255, then R=r+1, S=r+s−255.

Figure 24:
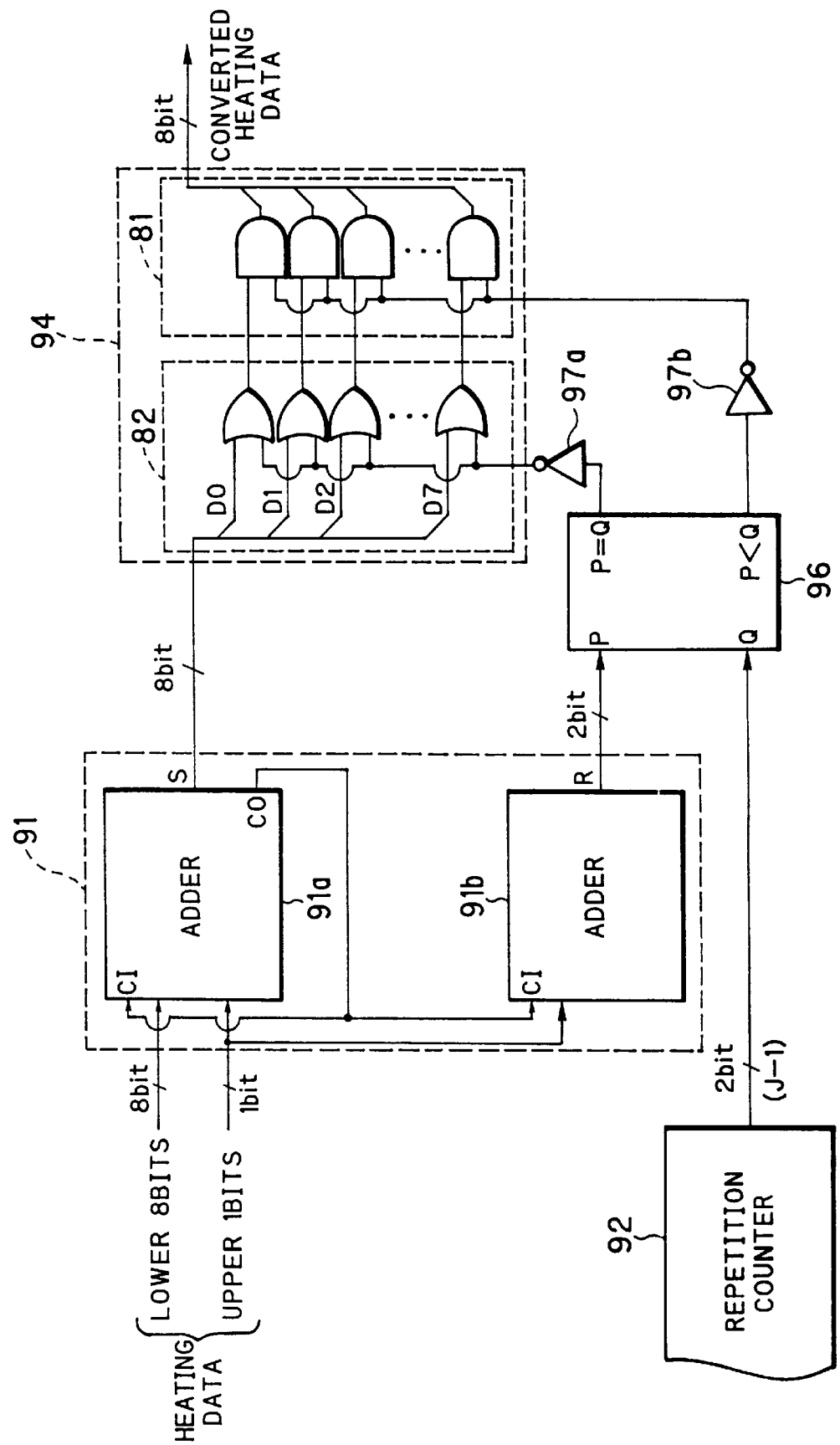
FIG. 24 is a circuit diagram showing another example of the structure of the heating data divider.

FIG. 24 shows a modification of the heating data divider shown in FIG. 21. In FIG. 24, like circuit elements to those shown in FIG. 21 are represented by using identical reference numerals. Different from that shown in FIG. 21, the AND gate array 81 and the OR gate array 82 are changed in interconnection positions. Further, the magnitude comparator 96 used may be a comparator which outputs "H level" when the reference data is equal to the count data, and outputs "H level" when the former is smaller than the latter. The two judgement signals from the magnitude comparator 96 are inverted by inverters 97a and 97b. A magnitude comparator of a negative logic or a combination of negative and passive logic may be used.

Consider now that a K-bit head driver is used and 0 to M-th tonal level is expressed by (K+n)-bit heating data. The number Z representative of (K+n) bits can be expressed as in the following, where r and s are numbers of the upper n-bits and lower K bits of the (K+n)-bit data.

$$Z = 2^k \times r + s$$
$$= N \times r + (2^k - N) \times r + s.$$

The heating sequence is repeated R times and each heating element is driven S times same as the number Z representative of (K+n) bits. In this case, Z=N×R+S. The numbers R and S are given by:

If $(2^k-1) \times r + s \leq N$, then R=r, S=(2-N)×r+s.

If $(2^k-1) \times r + s > N$, then R r+1, S=$(2^k-N) \times r + s - N$.

Similar to the above, if $(2^k-1) \times r + s = N$, both are satisfied so that the numbers R and S may be given by:

If $(2^k-1) \times r + s < N$, then R=r, S=$(2^k-N) \times r + s$.

If $(2^k-1) \times r + s \geq N$, then R=r+1, S=$(2^k-N) \times r + s - N$.

As to the number P of heating sequence times, a minimum integer larger than M/N (a value added 1 to a maximum value of the number R) is a value MIN with its fraction part rounded. For the J-th heating sequence, the (K+n)-bit heating data is converted into converted data representative of the numbers R and S. In this case, 9-bit heating data is converted into K-bit converted heating data under the following conditions:

If R<J-1, converted heating data representative of a number "0" is output;

If R=J-1, converted heating data representative of a number "S" is output; and

If R>J-1, converted heating data representative of a number "N" is output.

Consider for example the case wherein an 8-bit head driver with the number of heating times of 255 is used to express 0 to 1020(=255×4) tonal levels by using 10-bit heating data. In this case, heating data at each heating sequence is divided into upper 2 bits and lower 8 bits. In accordance with the obtained number R and the heating sequence number J, the heating data is converted into first to fourth converted heating data depending upon the above conditions. By using these converted heating data, the heating sequence is executed four times to print an image expressed by 0 to 1020(=255×4) tonal levels. If an image of 0 to 1020 tonal levels is printed by using 10-bit image data, the heating sequence is executed five times by using first to fifth converted image data.

In the above embodiments, the bias heating is performed by using bias data. The bias heating may be performed by using image data. In this case, the pulse width of a strobe pulse for the first drive data generated by using the comparison data "0" is made wider to generate a bias heating energy.

In the head driver shown in FIG. 4, the comparator is used for judging whether the image data is larger than the comparison data. With this comparator, the heating element is not heated when the image data is "0", and the bias heating is impossible. Similarly, with the head driver shown in FIG. 15, the heating element cannot be driven when the image data is "0".

If the image data is "0", the thermosensitive coloring layer is not required to develop color and the bias heating is not necessary. However, since the heating element has good heat dissipation, it may be cooled excessively. If the heating element is cooled excessively, the heating element does not raise its temperature to a predetermined value even after the bias heating and image heating are sequentially performed for printing the next one line pixels. Therefore, a coloring heating energy corresponding to the record density cannot be applied to a color thermosensitive recording sheet, and the pixel density recorded with the heating element is lowered.

Figure 25:
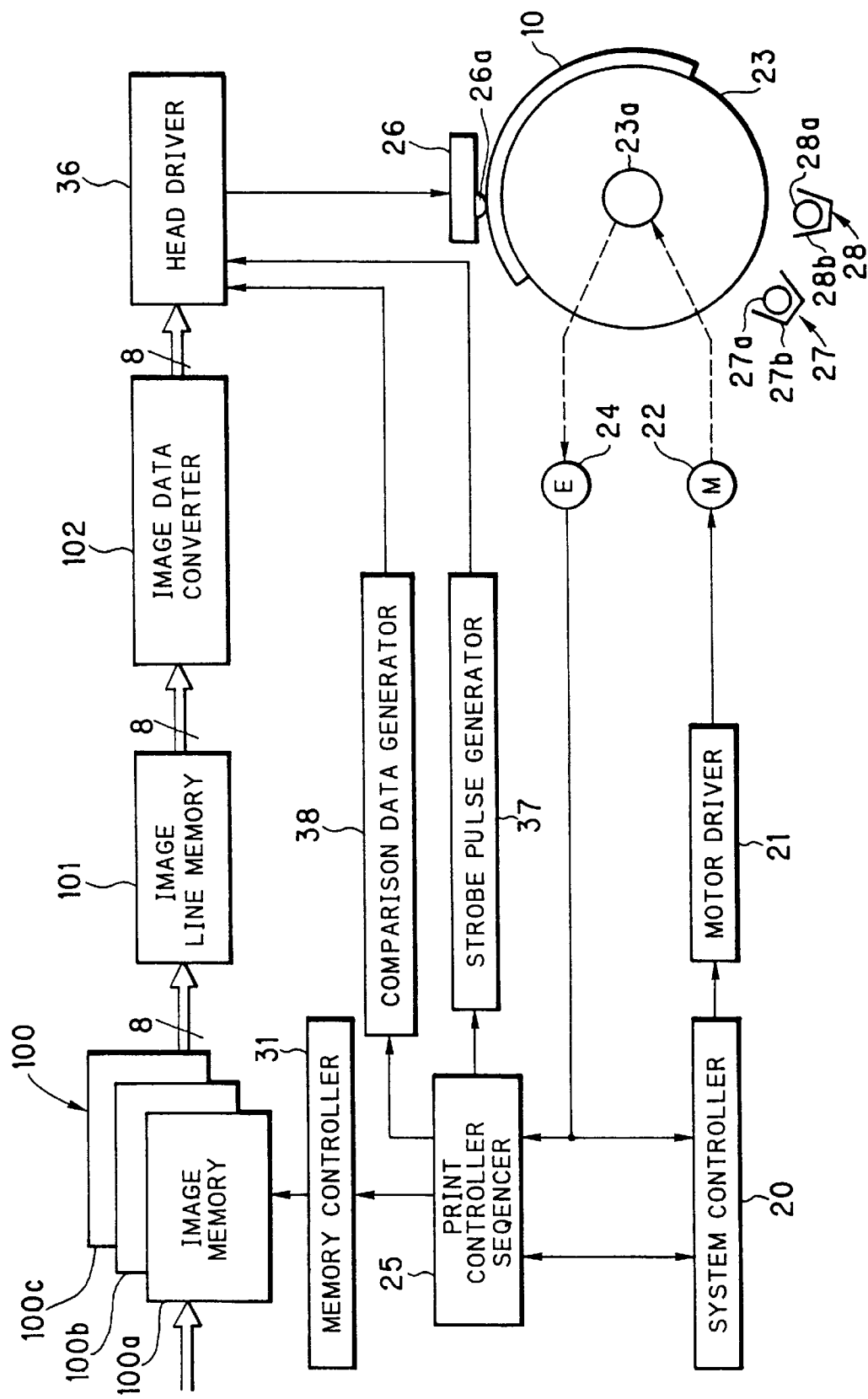
FIG. 25 is a schematic diagram showing a thermal printer with an image data converter for converting image data of "0" into image data of "1"
Figure 26:
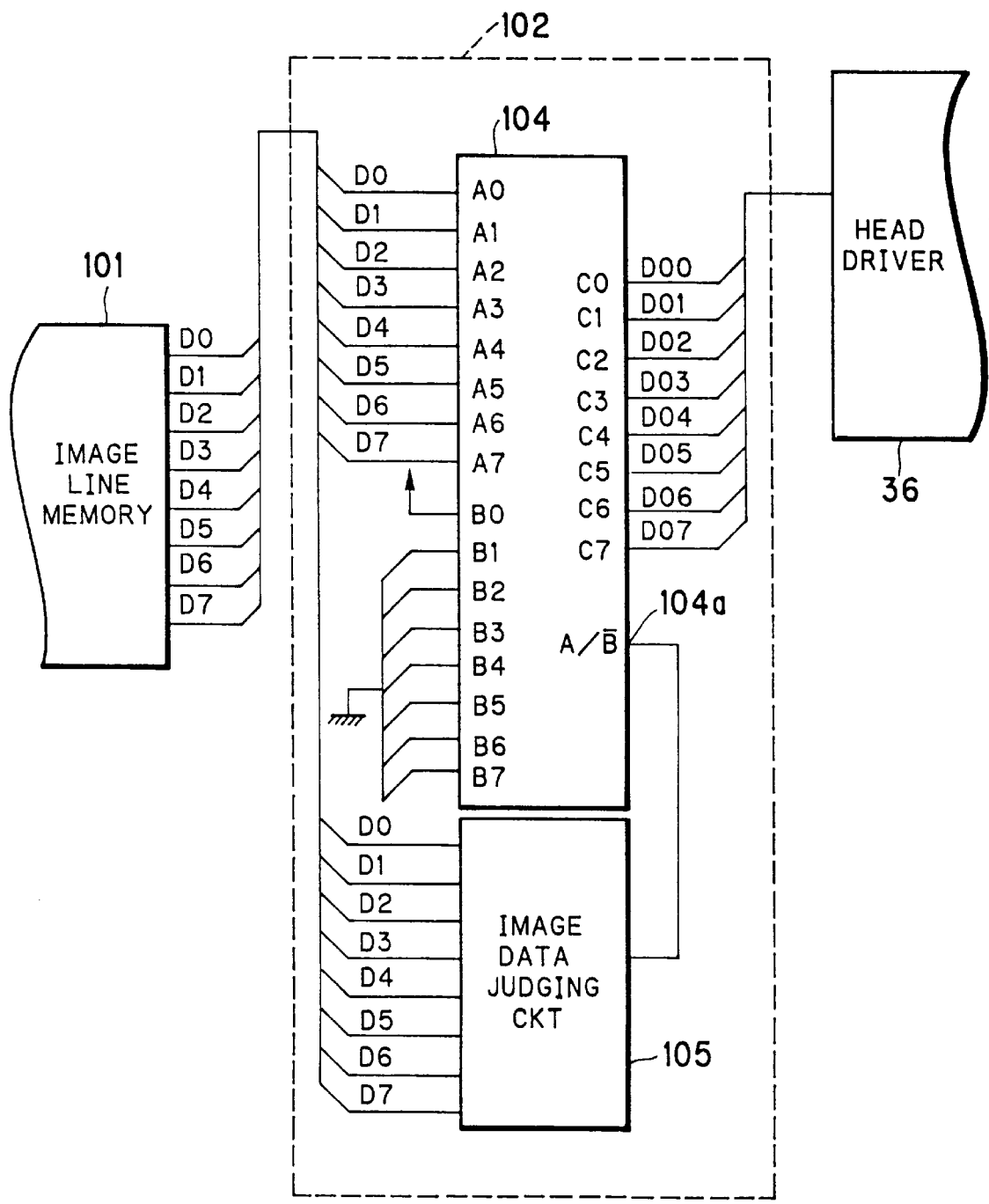
FIG. 26 is a circuit diagram showing an example of the structure of the image data converter.

FIGS. 25 to 26 illustrate another embodiment wherein in order to prevent an image quality from being lowered by an excessively cooled heating element, the image data having a number "0" is converted into image data having a number "1" to heat the heating element even for the image data of "0".

Referring to FIG. 25, an image memory 100 is constituted by yellow, magenta, and cyan image memories 100a to 100c, each storing 8-bit image data. One line image data read from the image memory corresponding to the color to be printed, is written in an image line memory 101. Each pixel data set of the one line image data is sequentially read from the image line memory 101 and sent to an image data converter 102. This image data converter 102 converts the image data, if its number is "0", into image data having a number "1", and sends it to the head driver 36. If the image data has a number other than "0", this image data is directly sent to the head driver 36.

The strobe signal generator 38 generates 255 strobe pulses in total for printing one line of one color. The first strobe pulse is used for the bias heating, and has a wide pulse width. The second to 255-th strobe pulses are used for the image heating, and have a narrow pulse width. Other circuit elements are substantially the same as those shown in FIG. 3, and represented by using identical reference numerals.

Referring to FIG. 26, the image data converter 102 is constituted by a data selector 104 and an image data judging circuit 105. The data selector 104 has an A port (A0 to A7 terminals) and a B port (B0 to B7 terminals) for parallel input of 8-bit data, a switch terminal (A/bar B) 104a for selecting one of the A and B ports, and a C port (C0 to C7 terminals) for outputting 8-bit data from the selected port. To the A0 to A7 terminals of the A port of the data selector 104, 8 bits D0 to D7 of the image data output from the image line memory 101 are input. Since the B1 to B7 terminals of the B port are pulled down to "L level", the upper 7 bits of the input data is made "0". The B0 terminal is pulled up to "H level" and the lowest bit of the input data is made "1". The C port is connected to the head driver 36.

The data selector 104 selects the A port when the judgement signal input to the switch terminal 104a is H level, and outputs the signal levels at the A0 to A7 terminals from the C port. If the judgement signal is "L level", the data selector 104 selects the B port, and outputs the signal levels at the B0 to B7 terminals from the C port.

The image data judgement circuit 105 judges whether the number of the image data is "0", and is input with image data from the image line memory 101. The image data judgement circuit 105 is constituted by, for example, an OR gate with eight input terminals. The image data judgement circuit 105 outputs the judgement signal of "L level" only when all the bits D0 to D7 of the image data are "0" (L level).

If the image data is "0", the image data judgement circuit 105 generates the judgement signal of "L level". In response to this signal, the B port of the data selector 104 is selected, and the image data "0" is converted into the image data of "1" which is output from the C port. If the image data has a number other than "0" the A port is selected and the 8-bit from the image line memory 101 is output as the converted image data from the C port.

Figure 27:
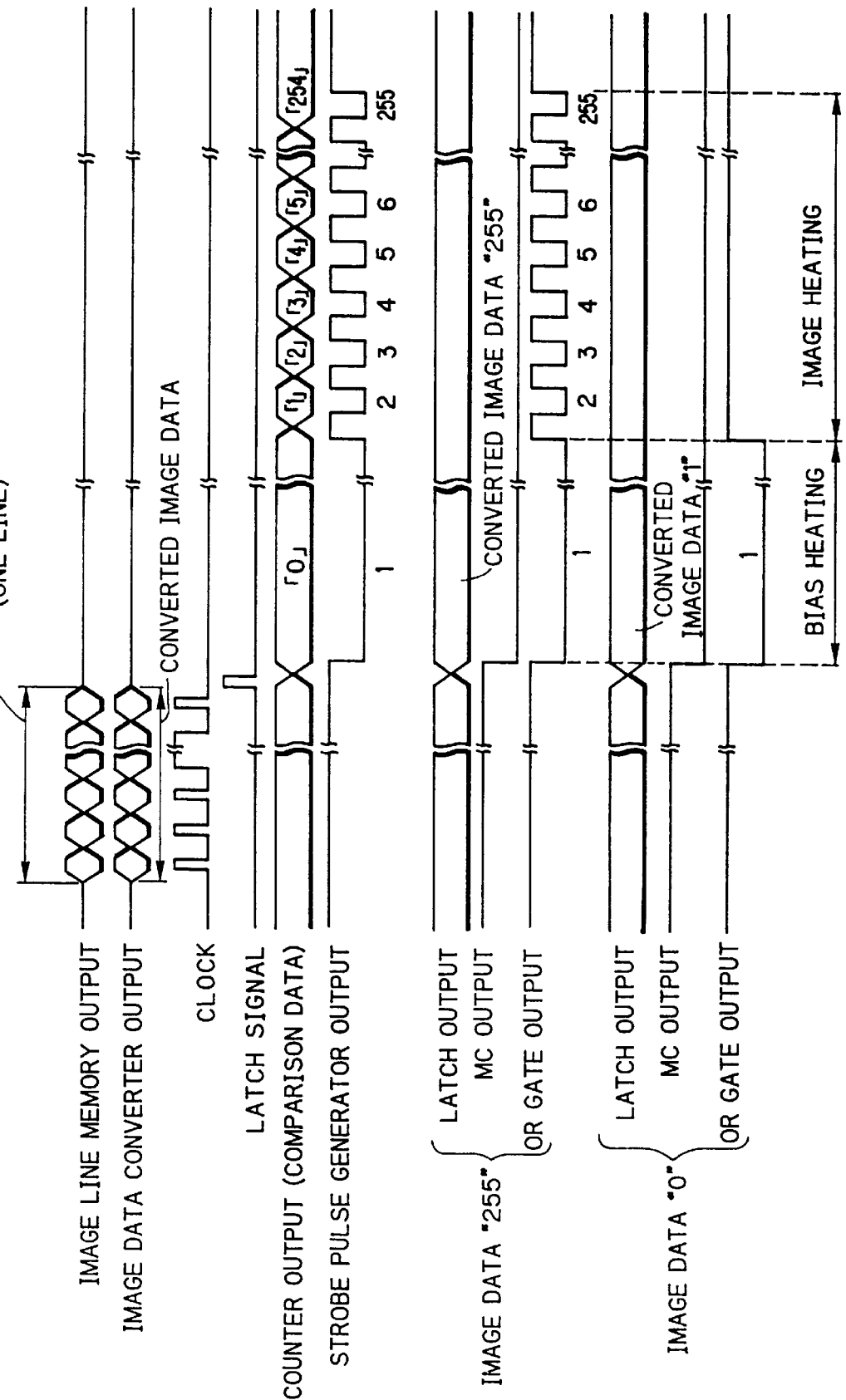
FIG. 27 is a timing chart illustrating the print state by the thermal printer shown in FIG. 25.

FIG. 27 illustrates a print state of image data "0" and "255". If the image data is "0", the image data converter 102 outputs the converted image data of "1". With the converted image data of "1", one drive data is generated. With this drive data and the wide first strobe pulse, each heating element is heated once. The first strobe pulse performs the bias heating.

Even for the image data "0", the bias heating is executed, so that all the lines are subjected to the bias heating and the heating elements can be prevented from being cooled excessively. Therefore, a dot printed in a pixel after the line with the image data of "0" can develop color to a predetermined density.

If the image data is "1", it is directly used as the converted image data and the bias heating only is performed similar to the image data of "0". If the image data is "2", the image heating is performed after the bias heating. At this image heating, each heating element is heated once. If the image data is "255", each heating element is heated 254 times during the image heating. Therefore, the bias heating using the image data reduces the number of heating times during the image heating period smaller by one than the number corresponding to the number of the image data. However, this poses no practical problem.

In the above embodiments, although 9-bit heating data is used for an 8-bit head driver, 10- and 11-bit heating data may be used. For the 10-bit heating data, the heating sequence is performed four or five times, and for the 11-bit heating data, the heating sequence is performed eight or nine times. For the 10-bit heating data, three heating sequences are performed if the number of tonal levels is "765". Furthermore, 8-bit heating data may be applied to a 7-bit head driver. Still further, although each heating element is intermittently driven as many times as that corresponding to the number of heating data, by using strobe pulses, each heating element may be continuously driven during a time period corresponding to the heating data, without using strobe pulses.

In expressing 436 tonal levels by using 9-bit image data, the second heating sequence uses comparison data "0" to "179". If the image heating period is terminated when each heating element is driven with respect to the comparison data "179", an image can be printed faster.

The bias heating energy for each color may be lower than the energy immediately before the thermosensitive coloring layer develops color. In this case, the image heating energy is increased by the amount of the lowered fraction of the bias heating energy. Instead of increasing the width of drive pulses during all image heating sequences, the width of drive pulses only during the first image heating sequence may be increased.

The invention is applicable to thermal transfer type printers using ink films as well as thermosensitive type thermal printers. In the above embodiments, although line printers are used, serial printers may also be used. Also in the above embodiments, gradation expression is performed by changing the density of each pixel. This invention is also applicable to thermal printers using an area gradation method wherein the length of an ink dot printed in a pixel is changed in the sub-scan direction in accordance with the density of the dot. In this case, while the thermal head moves relative to the color thermosensitive recording sheet by a half length of a pixel in the sub-scan direction, ink dots corresponding in number to the first converted heating data are transferred to the pixel, and while the thermal head moves by the remaining half length, ink dots corresponding in number to the second converted heating data are transferred to the pixel.

Instead of a platen drum, a reversible transport roller pair may be used for nipping a recording sheet with the roller pair and reciprocating the recording sheet three times.

The present invention has been described in connection with the preferred embodiments. The invention is not limited only to the above embodiments. It is apparent to those skilled in the art that various modifications, improvements, combinations and the like can be made without departing from the scope of the appended claims.

What is claimed is:

1. A thermal printing method in which a heating element array and a head driver are used, the heating element array having a plurality of heating elements disposed in line and the head driver driving each heating element at the same time in accordance with each set of heating data of K bits, a heating sequence is started upon inputting of the heating data to the head driver and ended upon a completion of driving each heating element, and dots of one line are printed by applying a heat energy corresponding to the heating data to a recording sheet, and in printing the dots, each of the heating elements is subjected to bias heating using the bias data and thereafter to image heating using the image data, the thermal printing method comprising the steps of:

in printing the dots on a line of the recording sheet by using heating data of (K+n) bits where n is an integer of 1 or larger, converting the heating data of (K+n) bits into P sets of converted heating data of K bits; and continuously executing P heating sequences on the line of the recording sheet by using each of the P sets of the converted heating data of K bits and wherein the number of P heating sequences is equal to $2^n$ or ($2^n+1$).

2. A thermal printing method in which a heating element array and a head driver are used, the heating element array having a plurality of heating elements disposed in line and the head driver driving each heating element at the same time in accordance with heating data of K bits including bias data and image data representative of a tonal level and representative of numbers from O to N, a heating sequence is started upon inputting the heating data to the head driver and ended upon completion of driving each heating element, and dots of one line are (recorded) printed by applying a heat energy corresponding to the heating data to a recording sheet, the thermal printing method comprising the steps of:

in printing dots having M tonal levels on a line of the recording sheet by using heating data of (K+n) bits where n is an integer of 1 or larger, continuously executing the heating sequence P times on the line for a single set of the heating data, where P is equal $2^n$ or ($2^n+1$) (an integer equal to or larger than M/N);

at a J-th time of the heating sequence where J is an optional number from 1 to P, converting the (K+n)-bit heating data into K-bit converted heating data in accordance with the number J and the value represented by the (K+n)-bit heating data; and inputting the converted heating data to the head driver.

3. The thermal printing method according to claim 2, wherein the heating data comprises bias data and image data, and in printing the dots, each of the heating elements is subjected to bias heating using the bias data and thereafter to image heating using the image data.

4. The thermal printing method according to claim 2, wherein at the J-th time of the heating sequence, the heating data is converted into the converted heating data representative of the number N if Z>J×N where Z represents a value of the heating data, converted into the converted heating data representative of a difference between the value Z and a number (J−1)×N if (J−1)×N≦Z≦J×N, and converted into the converted heating data representative of the number O if Z<(J−1)×N.

5. The thermal printing method according to claim 2, wherein at the J-th time of the heating sequence, the heating data is converted into the converted heating data representative of the number N if Z≧J×N where Z represents a value of the heating data, converted into the converted heating data representative of a difference between the value Z and a number (J−1)×N if (J−1)×N<Z<J×N, and converted into the converted heating data representative of the number O if Z≦(J−1)×N.

6. A thermal printer in which a heating element array and a head driver are used, the heating element array having a plurality of heating elements disposed in line and the head driver driving each heating element at the same time in accordance with each set of heating data of K bits representative of numbers from O to N, and each heating element is driven in accordance with each set of heating data to print dots of one line on a recording sheet, the thermal printer comprising:

a print control sequencer for continuously executing P heating sequences for a single set of the heating data, where P is an integer equal to or larger than M/N, to print dots having M (M is an integer larger than N) tonal levels by using heating data of (K+n) bits where n is an integer of 1 or larger; and heating data dividing means for converting, at a J-th heating sequence where J is an optional number from 1 to P, the (K+n)-bit heating data into K-bit converted heating data in accordance with the number J and the value represented by the (K+n)-bit heating data, and for inputting the converted heating data to the head driver;

a single set of heating data being divided into P sets of converted heating data to execute the P heating sequences.

7. The thermal printer according to claim 6, wherein the heating data is image data and the thermal printer further comprises:

a frame memory for storing the image data of one frame;

an image line memory for storing the image data of one line read from the frame memory; and a bias line memory for storing K-bit bias data of one line;

wherein bias heating is executed by using the bias data of one line read from the bias line memory, and thereafter image heating is executed by continuously executing the P heating sequences for the image data of one line read from the image line memory, the dots of one line are printed by the bias heating and the image heating.

8. The thermal printer according to claim 6, wherein the heating data comprises image data and bias data and the thermal printer further comprises:

a frame memory for storing the image data of one frame;

an image line memory for storing the image data of one line read from the frame memory; and a bias line memory for storing bias data of one line;

wherein bias heating is executed by continuously executing the P heating sequences for the bias data of one line read from the bias line memory, and thereafter image heating is executed by continuously executing the P heating sequences for the image data of one line read from the image line memory, whereby the dots of one line are printed by the bias heating and the image heating.

9. The thermal printer according to claim 8, wherein the recording sheet is a thermosensitive recording sheet having at least one thermosensitive coloring layer and developing color at a density corresponding to a heat energy applied thereto.

10. The thermal printer according to claim 6, wherein the number P of the heating sequences is $2^n$ or ($2^n$+1).

11. The thermal printer according to claim 6, wherein the integer number n is 1, the number P of the heating sequences is 2, and the heating data dividing means converts the heating data into K-bit first converted heating data at the first heating sequence and into K-bit second converted heating data at the second heating sequence.

12. The thermal printer according to claim 11, wherein the heating data dividing means comprises:

a first data selector for outputting the first converted heating data representative of the number N if the heating data is $2^K$ or larger, and outputting lower K bits of the heating data as the first converted heating data if the heating data is N or smaller;

a second data selector for outputting lower K bits of the heating data as the second converted heating data if the heating data is $2^K$ or larger, and outputting the second converted heating data representative of a number O if the heating data is N or smaller; and means for selecting the first data selector for the first heating sequence and the second data selector for the second heating sequence.

13. The thermal printer according to claim 12, wherein the heating data dividing means further comprises:

an adder for adding a number 1 to the lower eight bits of the heating data and sending an addition value to the second data selector; and a data conversion circuit for converting the heating data into a number ($2^{K+1}$−2) and sending the number to the first data selector and the adder if the heating data has a value ($2^{K+1}$−1), and sending the heating data itself to the first data selector and the adder if the heating data has a value ($2^{K+1}$−2) or smaller.

14. The thermal printer according to claim 12 or 13, wherein the first and second data selectors judge that the heating data has a value $2^K$ or larger if the highest bit of the heating data is 1 and that the heating data has a value ($2^K$−1) or smaller if the highest bit is O.

15. The thermal printer according to claim 6, wherein the heating data dividing means comprises:

comparison area setting means for outputting a number (J−1)×N and a number J×N at the J-th heating sequence;

judging means for judging which value is larger among the values (J−1)×N and J×N supplied from the comparison area setting means and the value Z of the heating data; and data converting means for converting the heating data into converted heating data in accordance with a judgement result by the judging means.

16. The thermal printer according to claim 15, wherein:

the judging means judges whether the judgement result falls in any one of a first range of Z>J×N, a second range of (J−1)×N≦Z≦J×N, and a third range of Z≦(J−1)×N; and the data converting means outputs the converted heating data representative of the number N if the judgement result is the first range, the converted heating data representative of a difference between the value Z and the number (J−1)×N if the judgement result is the second range, and the converted heating data representative of a number O if the judgement result is the third range.

17. The thermal printer according to claim 15, wherein:

the judging means judges whether the judgement result falls in any one of a first range of Z≧J×N, a second range of (J−1)×N≦Z<J×N, and a third range of Z<(J−1)×N; and the data converting means outputs the converted heating data representative of N tonal levels if the judgement result is the first range, the converted heating data representative of a difference between the value Z and the number (J−1)×N if the judgement result is the second range, and the converted heating data representative of a number O if the judgement result is the third range.

18. The thermal printer according to claim 15, wherein:

the judging means judges whether the judgement result falls in any one of a first range of Z≧J×N, a second range of (J−1)×N<Z<J×N, and a third range of Z≦(J−1)×N; and the data converting means outputs the converted heating data representative of N tonal levels if the judgement result is the first range, the converted heating data representative of a difference between the value Z and the number (J−1)×N if the judgement result is the second range, and the converted heating data representative of a number O if the judgement result is the third range.

19. The thermal printer according to claim 15, wherein:

the judging means judges whether the judgement result falls in any one of a first range of Z≧J×N, a second range of (J−1)×N<Z<J×N, and a third range of Z≦(J−1)×N; and the data converting means outputs the converted heating data representative of N tonal levels if the judgement result is the first range, the converted heating data representative of a difference between the value Z and the number (J−1)×N if the judgement result is the second range, and the converted heating data representative of a number O if the judgement result is the third range.

20. The thermal printer according to claim 6, wherein the heating data dividing means comprises:

a counter for outputting a number (J−1) at the J-th heating sequence where J is an optional number from 1 to P;

data converting means for outputting first K-bit data representative of a value $(2^K-N) \times r + s$ and second data representative of a value r if the value $(2^K-N) \times r + s$ is N or smaller, and outputting first K-bit data representative of a value $(2^K-N) \times r + s - N$ and second data representative of a value (r+1) if the value $(2^K-N) \times r + s$ is larger than N, wherein each set of heating data is divided into the upper n bits and lower K bits, a value of the upper n bits is r, and a value of the lower K bits is s;

judging means for judging which of the value of the second data from the data converting means and the value (J−1) from the counter is larger; and data selecting means responsive to a judgment result of the judging means for outputting K-bit data representative of the value N to the head driver if the second data is larger than the value (J−1), outputting the first K-bit data to the head driver if the second data is equal to the value (J−1), and outputting the K-bit data representative of a number O to the head driver if the second data is smaller than the value (J−1).

21. The thermal printer according to claim 6, wherein the heating data dividing means comprises:

a counter for outputting a number (J−1) at the J-th heating sequence where J is an optional number from 1 to P;

data converting means for outputting first K-bit data representative of a value $(2^K-N) \times r + s$ and second data representative of a value r if the value $(2^K-N) \times r + s$ is smaller than N, and outputting first K-bit data representative of a value $(2^K-N) \times r + s - N$ and second data representative of a value (r+1) if the value $(2^K-N) \times r + s$ is N or larger, wherein each set of heating data is divided into the upper n bits and lower K bits, a value of the upper n bits is r, and a value of the lower K bits is s;

judging means for judging which of the value of the second data from the data converting means and the value (J−1) from the counter is larger; and data selecting means responsive to a judgment result of the judging means for outputting K-bit data representative of the value N to the head driver if the second data is larger than the value (J−1), outputting the first K-bit data to the head driver if the second data is equal to the value (J−1), and outputting the K-bit data representative of a number O to the head driver if the second data is smaller than the value (J−1).

22. A thermal printer comprising:

a heating element array having a plurality of heating elements disposed in line;

a head driver for comparing heating data including bias data and image data of K bits representative of numbers from O to N with comparison data incrementing by one from the number O to a number (N−1) and for heating the heating element array if the bias data is larger than the comparison data, the heating elements being driven at the same time in accordance with each set of heating data to print dots of one line on a recording sheet; and data converting means for converting image data having a value O into image data having a value 1 and supplying the image data having the value 1 to the head driver in place of the image data having a value 0.

23. The thermal printer according to claim 22, wherein the recording sheet is a thermosensitive recording sheet having at least one thermosensitive coloring layer and developing color at a density corresponding to a heat energy applied thereto, and if the comparison data is O, each heating element is subjected to bias heating to heat the heating element to a temperature immediately before the at least one thermosensitive coloring layer develops color, and if the comparison data is a number from 1 to (N−1), each heating element is subjected to image heating to develop color at a density corresponding to each set of heating data.

24. A method of thermal printing comprising the steps of:

a) providing heating data of (K+n) bits including bias data and image data for printing dots on a line of a recording sheet, wherein n is an integer larger than 1, and wherein in printing the data, each of the heating elements is subjected to bias heating using bias data and thereafter to image heating using the image data;

b) converting the heating data of (K+n) bits into P sets of converted heating data of K bits; and c) continuously executing P heating sequences on the line of the recording sheet by using each of the P sets of the converted heating data of K bits and wherein the number of P heating sequences is equal to $2^n$ or $(2^n+1)$.

25. The method of thermal printing of claim 24, further comprising repeating steps a) through c) for each line of the recording sheet to print an image.

26. The method of thermal printing of claim 24, wherein the recording sheet is a thermosensitive recording sheet having at least one thermosensitive coloring layer.

27. A thermal printer comprising:

image data means for providing image data of (K+n) bits for printing dots on a line of a recording sheet, wherein n is an integer of 1 or larger;

conversion means for converting the image data of (K+n) bits into P sets of image data of K bits;

a heating element array having a plurality of heating elements;

a head driver for heating the heating elements; and control means for continuously executing P heating sequences on the line of the recording sheet by driving the heating elements with said head driver using the P sets of the converted data of K bits and wherein the P heating sequences are equal in number to $2^n$ or $(2^n+1)$.

28. The thermal printer of claim 27, wherein said control means executes continuous respective P heating sequences on each line of the recording medium by driving the heating elements with said head driver using respective P sets of converted data of K bits to record an image.

29. The thermal printer of claim 27, wherein the recording sheet is a thermosensitive recording sheet having at least one thermosensitive coloring layer.

* * * * *